US012148350B2

(12) United States Patent
Wang

(10) Patent No.: US 12,148,350 B2
(45) Date of Patent: Nov. 19, 2024

(54) DRIVING CIRCUIT, DRIVING METHOD, DRIVING MODULE AND DISPLAY DEVICE

(71) Applicant: BOE Technology Group Co., Ltd., Beijing (CN)

(72) Inventor: Zhichong Wang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/772,052

(22) PCT Filed: May 25, 2021

(86) PCT No.: PCT/CN2021/095775

§ 371 (c)(1),
(2) Date: Apr. 26, 2022

(87) PCT Pub. No.: WO2022/246642

PCT Pub. Date: Dec. 1, 2022

(65) Prior Publication Data

US 2024/0144851 A1 May 2, 2024

(51) Int. Cl.
*G09G 3/20* (2006.01)

(52) U.S. Cl.
CPC ... *G09G 3/2092* (2013.01); *G09G 2310/0267* (2013.01); *G09G 2310/062* (2013.01); *G09G 2310/08* (2013.01)

(58) Field of Classification Search
CPC ......... G09G 3/2092; G09G 2310/0267; G09G 2310/062; G09G 2310/08; G09G 2310/0286
See application file for complete search history.

(56) References Cited

U.S. PATENT DOCUMENTS

| | | | | |
|---|---|---|---|---|
| 10,013,919 | B2 | 7/2018 | Yang et al. | |
| 2017/0323593 | A1* | 11/2017 | Kim | G09G 3/2092 |
| 2018/0012550 | A1* | 1/2018 | Lim | G09G 3/3225 |
| 2018/0174553 | A1* | 6/2018 | Bong | G09G 3/3266 |
| 2018/0350306 | A1* | 12/2018 | Zhang | G09G 3/3233 |
| 2020/0202785 | A1 | 6/2020 | Yang et al. | |
| 2021/0074203 | A1 | 3/2021 | Kim et al. | |
| 2021/0090491 | A1 | 3/2021 | Park | |
| 2021/0118389 | A1 | 4/2021 | Zhang et al. | |

(Continued)

FOREIGN PATENT DOCUMENTS

| | | | |
|---|---|---|---|
| CN | 109903715 | A | 6/2019 |
| CN | 110211539 | A | 9/2019 |
| CN | 110322851 | A | 10/2019 |

(Continued)

*Primary Examiner* — Roberto W Flores
(74) *Attorney, Agent, or Firm* — IPro, PLLC

(57) ABSTRACT

The present disclosure provides a driving circuit, a driving method, a driving module and a display device. The driving circuit includes a light-emitting control signal generating circuit and a gate driving circuit; the gate driving circuit is configured to control the gate driving signal output terminal to output the gate driving signal under the control of the potential of the first node, a first input signal provided by the first input terminal and a reset signal provided by the reset terminal, according to a first clock signal provided by the first clock signal terminal and a first voltage signal provided by the first voltage terminal.

19 Claims, 23 Drawing Sheets

(56) References Cited

U.S. PATENT DOCUMENTS

| | | | |
|---|---|---|---|
| 2022/0180816 | A1 | 6/2022 | Yuan et al. |
| 2022/0310017 | A1 | 9/2022 | Yang |

FOREIGN PATENT DOCUMENTS

| | | | |
|---|---|---|---|
| CN | 110930942 | A | 3/2020 |
| CN | 111292664 | A | 6/2020 |
| CN | 111415624 | A | 7/2020 |
| CN | 111445854 | A | 7/2020 |
| CN | 111508433 | A | 8/2020 |
| CN | 111710293 | A | 9/2020 |
| CN | 111816123 | A | 10/2020 |
| CN | 112017592 | A | 12/2020 |
| CN | 112259038 | A | 1/2021 |
| CN | 112542119 | A | 3/2021 |
| CN | 112562596 | A | 3/2021 |
| EP | 4068263 | A1 | 10/2022 |

* cited by examiner

DRIVING CIRCUIT, DRIVING METHOD, DRIVING MODULE AND DISPLAY DEVICE

This application is the U.S. national phase of PCT Application No. PCT/CN2021/095775 filed on May 25, 2021, which are incorporated herein by reference in their entities.

TECHNICAL FIELD

The present disclosure relates to the field of display technology, and more particularly to a driving circuit, a driving method, a driving module and a display device.

BACKGROUND

In the related art, two driving circuits are used to generate the light-emitting control signal and the gate driving signal respectively, which cannot simplify the driving solution and is not conducive to narrowing the frame.

SUMMARY

A first aspect of the present disclosure provides a driving circuit, including a light-emitting control signal generating circuit and a gate driving circuit; wherein the light-emitting control signal generating circuit includes a first node control circuit, a second node control circuit, a third node control circuit and a light-emitting control output circuit; the first node control circuit is configured to control a potential of a first node; the second node control circuit is configured to control a potential of a second node; the third node control circuit is configured to control a potential of a third node; the light-emitting control output circuit is configured to control a light-emitting control signal output terminal to output a light-emitting control signal according to the potential of the second node and the potential of the third node; the gate driving circuit is configured to control a gate driving signal output terminal to output a gate driving signal according to a first clock signal provided by a first clock signal terminal and a first voltage signal provided by a first voltage terminal under the control of the potential of the first node, a first input signal provided by a first input terminal and a reset signal provided by a reset terminal.

Optionally, the gate driving circuit comprises a fourth node control circuit and a gate output circuit; the fourth node control circuit is configured to control to connect or disconnect the fourth node and the reset terminal under the control of the potential of the first node, and control to connect or disconnect the fourth node and the first voltage terminal under the control of the first input signal provided by the first input terminal; the gate output circuit is configured to control to connect or disconnect the gate driving signal output terminal and the first clock signal terminal under the control of potential of the fourth node, and control to connect or disconnect the gate driving signal output terminal and the first voltage terminal under the control of the first input signal, and to control the gate driving signal provided by the gate driving signal output terminal according to the potential of the fourth node.

Optionally, the driving circuit further includes a gate reset circuit; wherein the gate reset circuit is configured to control to connect or disconnect the gate driving signal output terminal and the first voltage terminal under the control of the potential of the first node.

Optionally, the fourth node control circuit comprises a first transistor and a second transistor; a control electrode of the first transistor is electrically connected to the first node, a first electrode of the first transistor is electrically connected to the reset terminal, and a second electrode of the first transistor is electrically connected to the fourth node connect; a control electrode of the second transistor is electrically connected to the first input terminal, a first electrode of the second transistor is electrically connected to the fourth node, and a second electrode of the second transistor is electrically connected to the first voltage terminal.

Optionally, the gate output circuit comprises a third transistor, a fourth transistor and a first capacitor; a control electrode of the third transistor is electrically connected to the fourth node, a first electrode of the third transistor is electrically connected to the first clock signal terminal, and a second electrode of the third transistor is electrically connected to the gate driving signal output terminal; a control electrode of the fourth transistor is electrically connected to the first input terminal, a first electrode of the fourth transistor is electrically connected to the gate driving signal output terminal, and a second electrode of the fourth transistor is electrically connected to the first voltage terminal; a first terminal of the first capacitor is electrically connected to the fourth node, and a second terminal of the first capacitor is electrically connected to the gate driving signal output terminal.

Optionally, the gate reset circuit comprises a fifth transistor; a control electrode of the fifth transistor is electrically connected to the first node, a first electrode of the fifth transistor is electrically connected to the gate driving signal output terminal, and a second electrode of the fifth transistor is electrically connected to the first voltage terminal.

Optionally, the first node control circuit comprises a fifth node control sub-circuit and a first node control sub-circuit; the fifth node control sub-circuit is configured to control to connect or disconnect a fifth node and a second voltage terminal under the control of the first clock signal provided by the first clock signal terminal, and control to connect or disconnect the fifth node and the first clock signal terminal under the control of the potential of the third node; the first node control sub-circuit is configured to control the potential of the first node according to a potential of the fifth node and a second clock signal terminal.

Optionally, the fifth node control sub-circuit comprises a sixth transistor and a seventh transistor; a control electrode of the sixth transistor is electrically connected to the first clock signal terminal, a first electrode of the sixth transistor is electrically connected to the second voltage terminal, and a second electrode of the sixth transistor is electrically connected to the fifth node; a control electrode of the seventh transistor is electrically connected to the third node, a first electrode of the seventh transistor is electrically connected to the first clock signal terminal, and a second electrode of the seventh transistor is electrically connected to the fifth node.

Optionally, the first node control sub-circuit is configured to control to connect or disconnect the first node and the second clock signal terminal under the control of the potential of the fifth node, and control the potential of the first node according to the potential of the fifth node.

Optionally, the first node control sub-circuit comprises an eighth transistor and a second capacitor; a control electrode of the eighth transistor is electrically connected to the fifth node, a first electrode of the eighth transistor is electrically connected to the second clock signal terminal, and a second electrode of the eighth transistor is electrically connected to the first node; a first terminal of the second capacitor is electrically connected to the fifth node, and a second terminal of the second capacitor is electrically connected to the first node.

Optionally, the driving circuit further includes a conduction control circuit; wherein the conduction control circuit is configured to control to connect or disconnect the fifth node and a sixth node under the control of the second voltage signal provided by the second voltage terminal; the first node control sub-circuit is configured to control to connect or disconnect the first node and the second clock signal terminal under the control of the potential of the sixth node, and is configured to control the potential of the first node according to the potential of the sixth node.

Optionally, the first node control sub-circuit comprises an eighth transistor and a second capacitor, and the conduction control circuit comprises a first conduction control transistor; a control electrode of the first conduction control transistor is electrically connected to the second voltage terminal, a first electrode of the first conduction control transistor is electrically connected to the fifth node, and a second electrode of the first conduction control transistor electrically connected to the sixth node; a control electrode of the eighth transistor is electrically connected to a sixth node, a first electrode of the eighth transistor is electrically connected to the second clock signal terminal, and a second electrode of the eighth transistor is electrically connected to the first node; a first terminal of the second capacitor is electrically connected to the sixth node, and a second terminal of the second capacitor is electrically connected to the first node.

Optionally, the second node control circuit is configured to control to connect or disconnect the first node and the second node under the control of a second clock signal provided by a second clock signal terminal, and control to connect or disconnect the second node and the first voltage terminal under the control of a potential of the third node, and to maintain the potential of the second node.

Optionally, the second node control circuit comprises a ninth transistor, a tenth transistor and a control capacitor; a control electrode of the ninth transistor is electrically connected to the second clock signal terminal, a first electrode of the ninth transistor is electrically connected to the first node, and a second electrode of the ninth transistor is electrically connected to the second node; a control electrode of the tenth transistor is electrically connected to the third node, a first electrode of the tenth transistor is electrically connected to the first voltage terminal, and a second electrode of the tenth transistor is electrically connected to the second node; a first terminal of the control capacitor is electrically connected to the second node, and a second terminal of the control capacitor is connected to the first voltage terminal.

Optionally, the third node control circuit is configured to control to connect or disconnect the third node and the second input terminal under the control of the first clock signal provided by the first clock signal terminal, and control to connect or disconnect the third node and the first voltage terminal under the control of the potential of the fifth node and the second clock signal, and control the potential of the third node according to the second clock signal.

Optionally, the third node control circuit comprises an eleventh transistor, a twelfth transistor, a thirteenth transistor and a third capacitor; a control electrode of the eleventh transistor is electrically connected to the first clock signal terminal, a first electrode of the eleventh transistor is electrically connected to the second input terminal, and a second electrode of the eleventh transistor is electrically connected to the third node; a control electrode of the twelfth transistor is electrically connected to the fifth node, and a first electrode of the twelfth transistor is electrically connected to the first voltage terminal; a control electrode of the thirteenth transistor is electrically connected to the second clock signal terminal, a first electrode of the thirteenth transistor is electrically connected to a second electrode of the twelfth transistor, and a second electrode of the thirteenth transistor is electrically connected to the third node; a first terminal of the third capacitor is electrically connected to the second clock signal terminal, and a second terminal of the third capacitor is electrically connected to the third node.

Optionally, the third node control circuit comprises a seventh node control sub-circuit and a third node control sub-circuit; the seventh node control sub-circuit is configured to control to connect or disconnect a seventh node and the first voltage terminal under the control of the potential of the fifth node, and to control to connect or disconnect the seventh node and the second clock signal terminal under the control of the potential of the third node; the third node control sub-circuit is configured to control the potential of the third node according to a potential of the seventh node, and control to connect or disconnect the third node and the second input terminal under the control of the first clock signal provided by the first clock signal terminal.

Optionally, the third node control sub-circuit comprises an eleventh transistor and a third capacitor; the seventh node control sub-circuit comprises a twelfth transistor and a thirteenth transistor; a control electrode of the eleventh transistor is electrically connected to the first clock signal terminal, a first electrode of the eleventh transistor is electrically connected to the second input terminal, and a second electrode of the eleventh transistor is electrically connected to the third node; a control electrode of the twelfth transistor is electrically connected to the fifth node, a first electrode of the twelfth transistor is electrically connected to the first voltage terminal, and a second electrode of the twelfth transistor is electrically connected to the seventh node; a control electrode of the thirteenth transistor is electrically connected to the third node, a first electrode of the thirteenth transistor is electrically connected to the second clock signal terminal, and a second electrode of the thirteenth transistor is electrically connected to the seventh node; a first terminal of the third capacitor is electrically connected to the seventh node, and a second terminal of the third capacitor is electrically connected to the third node.

Optionally, the light-emitting control output circuit comprises a conduction sub-circuit; the third node control circuit comprises a third node control sub-circuit, a seventh node control sub-circuit and an eighth node control sub-circuit; the conduction sub-circuit is used to control to connect or disconnect the third node and an eighth node under the control of the second voltage signal provided by the second voltage terminal; the third node control sub-circuit is configured to control to connect or disconnect the second input terminal and the third node under the control of the first clock signal provided by the first clock signal terminal; the seventh node control sub-circuit is configured to control to connect or disconnect the seventh node and the first voltage terminal under the control of the potential of the fifth node, and control to connect or disconnect the seventh node and the second clock signal terminal under the control of a potential of the eighth node; the eighth node control sub-circuit is configured to control the potential of the eighth node according to the potential of the seventh node.

Optionally, the conduction sub-circuit comprises a second conduction control transistor, the third node control sub-circuit comprises an eleventh transistor, and the seventh node control sub-circuit including a twelfth transistor and a thirteenth transistor; the eighth node control sub-circuit includes a third capacitor; a control electrode of the second conduction control transistor is electrically connected to the second voltage terminal, a first electrode of the second conduction control transistor is electrically connected to the third node, and a second electrode of the second conduction control transistor is electrically connected to the eighth node; a control electrode of the eleventh transistor is electrically connected to the first clock signal terminal, a first electrode of the eleventh transistor is electrically connected to the second input terminal, and a second electrode of the eleventh transistor is electrically connected to the third node; a control electrode of the twelfth transistor is electrically connected to the fifth node, a first electrode of the twelfth transistor is electrically connected to the first voltage terminal, and a second electrode of the twelfth transistor is electrically connected to the seventh node; a control electrode of the thirteenth transistor is electrically connected to the eighth node, a first electrode of the thirteenth transistor is electrically connected to the second clock signal terminal, and a second electrode of the thirteenth transistor is electrically connected to the seventh node; a first terminal of the third capacitor is electrically connected to the seventh node, and a second terminal of the third capacitor is electrically connected to the eighth node.

Optionally, the light-emitting control output circuit comprises a first output transistor and a second output transistor; a control electrode of the first output transistor is electrically connected to the third node, a first electrode of the first output transistor is electrically connected to the second voltage terminal, and a second electrode of the first output transistor is electrically connected to the light-emitting control signal output terminal; a control electrode of the second output transistor is electrically connected to the second node, a first electrode of the second output transistor is electrically connected to the light-emitting control signal output terminal, and a second electrode of the second output transistor is electrically connected to the first voltage terminal.

Optionally, the light-emitting control output circuit comprises a second conduction control transistor, a first output transistor, and a second output transistor; a control electrode of the second conduction control transistor is electrically connected to the second voltage terminal, a first electrode of the second conduction control transistor is electrically connected to the third node, and a second electrode of the second conduction control transistor is electrically connected to the eighth node; a control electrode of the first output transistor is electrically connected to the eighth node, a first electrode of the first output transistor is electrically connected to the second voltage terminal, and a second electrode of the first output transistor is electrically connected to the light-emitting control signal output terminal; a control electrode of the second output transistor is electrically connected to the second node, a first electrode of the second output transistor is electrically connected to the light-emitting control signal output terminal, and a second electrode of the second output transistor is electrically connected to the first voltage terminal.

In a second aspect, an embodiment of the present disclosure provides a driving method, applied to the driving circuit, the driving method includes: controlling, by the gate driving circuit, the gate driving signal output terminal to output the gate driving signal according the first clock signal provided by the first clock signal terminal and the first voltage signal provided by the first voltage terminal under the control of the potential of the first node, the first input signal provided by the first input terminal, and the reset signal provided by the reset terminal.

Optionally, a driving cycle comprises a first input phase, a second input phase, a third input phase and a first reset phase which are arranged in sequence; the driving method includes: in the first input phase, the fourth node control circuit controlling to disconnect the fourth node from the reset terminal under the control of the potential of the first node, and controlling to disconnect the fourth node from the first voltage terminal under the control of the first input signal; the gate output circuit controlling to disconnect the gate driving signal output terminal from the first clock signal terminal under the control of the potential of the fourth node, and controlling to disconnect the gate driving signal output terminal from the first voltage terminal under the control of the first input signal, so that the gate driving signal output terminal maintains outputting the first voltage signal; in the second input phase, the fourth node control circuit controlling to connect the fourth node and the reset terminal under the control of the potential of the first node; the gate output circuit controlling to connect the gate driving signal output terminal and the first clock signal terminal under the control of the potential of the fourth node, so that the gate driving signal output terminal outputs the first voltage signal; in the third input phase, the fourth node control circuit controlling to disconnect the fourth node from the reset terminal under the control of the potential of the first node; the gate output circuit controlling to connect the gate driving signal output terminal and the first clock signal terminal under the control of the potential of the fourth node, so that the gate driving signal output terminal outputs the second voltage signal; in the first reset phase, the fourth node control circuit controlling to connect the fourth node and the reset terminal under the control of the potential of the first node, and controlling to connect the fourth node and the first voltage terminal under the control of the first input signal; the gate output circuit controlling to disconnect the gate driving signal output terminal from the first clock signal terminal under the control of the potential of the fourth node, and controlling to connect the gate driving signal output terminal and the first voltage terminal under the control of the first input signal, so that the gate driving signal output terminal outputs the first voltage signal.

Optionally, the driving circuit further comprises a gate reset circuit; the driving method further includes: in the first input phase, the gate reset circuit controlling to disconnect the gate driving signal output terminal from the first voltage terminal under the control of the potential of the first node; in the second input phase, the gate reset circuit controlling to connect the gate driving signal output terminal and the first voltage terminal under the control of the potential of the first node; in the third input phase, the gate reset circuit controlling to disconnect the gate driving signal output terminal from the first voltage terminal under the control of the potential of the first node; in the first reset phase, the gate reset circuit controlling to connect the gate driving signal output terminal and the first voltage terminal under the control of the potential of the first node.

In a third aspect, an embodiment of the present disclosure provides a driving module including a plurality of stages of driving circuit.

Optionally, a second input terminal of the driving circuit is electrically connected to a light-emitting control signal output terminal of an adjacent previous stage of driving circuit.

Optionally, a first input terminal of the driving circuit is electrically connected to a light-emitting control signal output terminal of an adjacent previous stage of driving circuit; or, the first input terminal of the driving circuit is electrically connected to the light-emitting control signal output terminal of the driving circuit.

Optionally, a reset terminal of the driving circuit is electrically connected to a light-emitting control signal output terminal of an adjacent next stage of driving circuit; or, the reset terminal is electrically connected to a gate driving signal output terminal of an adjacent previous stage of driving circuit.

In a fourth aspect, an embodiment of the present disclosure provides a display device including the driving module.

DETAILED DESCRIPTION

The technical solutions in the embodiments of the present disclosure will be clearly and completely described below with reference to the accompanying drawings in the embodiments of the present disclosure. Obviously, the described embodiments are only a part of the embodiments of the present disclosure, but not all of the embodiments. Based on the embodiments in the present disclosure, all other embodiments obtained by those of ordinary skill in the art without creative efforts shall fall within the protection scope of the present disclosure.

The transistors used in all the embodiments of the present disclosure may be triodes, thin film transistors, field effect transistors, or other devices with the same characteristics. In the embodiments of the present disclosure, in order to distinguish the two electrodes of the transistor other than the control electrode, one electrode is called the first electrode, and the other electrode is called the second electrode.

In actual operation, when the transistor is a triode, the control electrode may be the base electrode, the first electrode may be the collector, and the second electrode may be the emitter; or the control electrode may be the base electrode, the first electrode can be an emitter, and the second electrode can be a collector.

In actual operation, when the transistor is a thin film transistor or a field effect transistor, the control electrode may be a gate electrode, the first electrode may be a drain electrode, and the second electrode may be a source electrode. The control electrode may be a gate electrode, the first electrode may be a source electrode, and the second electrode may be a drain electrode.

Figure 1:
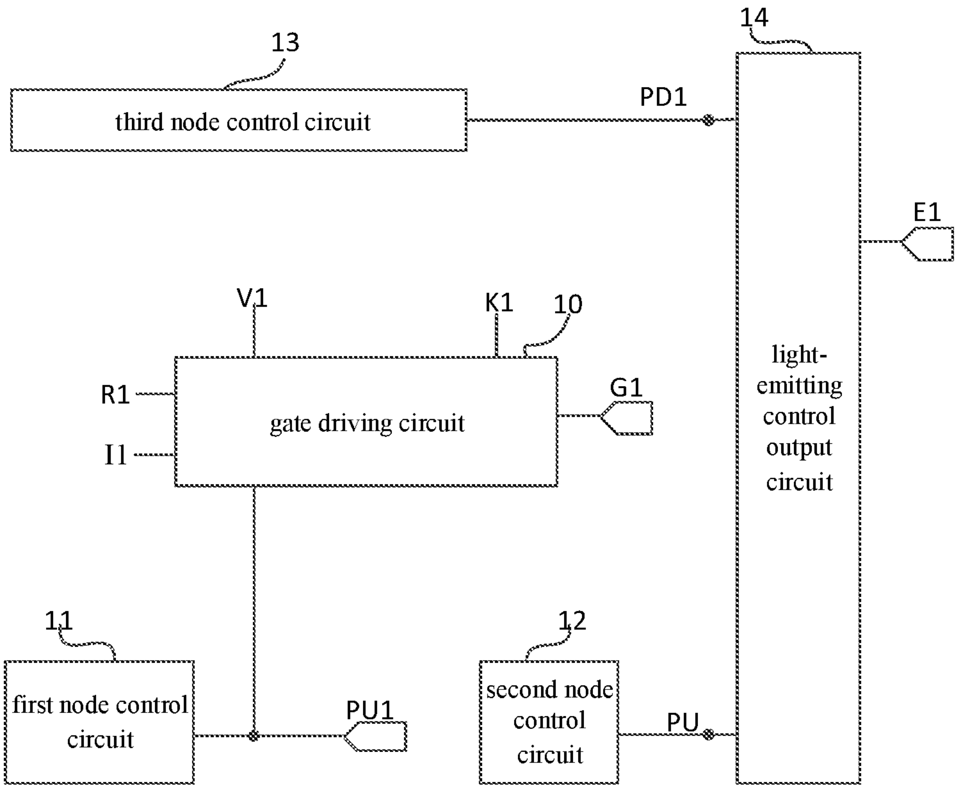
FIG. 1 is a structural diagram of a driving circuit according to an embodiment of the present disclosure.

As shown in FIG. 1, the driving circuit according to the embodiment of the present disclosure includes a light-emitting control signal generating circuit and a gate driving circuit 10; the light-emitting control signal generating circuit includes a first node control circuit 11, a second node control circuit 12, a third node control circuit 13 and a light-emitting control output circuit 14;

The first node control circuit 11 is electrically connected to a first node PU1, and configured to control a potential of the first node PU1;

The second node control circuit 12 is electrically connected to a second node PU, and configured to control a potential of the second node PU;

The third node control circuit 13 is electrically connected to a third node PD1, and configured to control a potential of the third node PD1;

The light-emitting control output circuit 14 is electrically connected to the second node PU, the third node PD1 and the light-emitting control signal output terminal E1, and is used to control a light-emitting control signal output terminal E1 to output a light-emitting control signal according to the potential of the second node PU and the potential of the third node PD1;

The gate driving circuit 10 is electrically connected to the first node PU1, a first input terminal I1, a reset terminal R1, a first clock signal terminal K1, a first voltage terminal V1 and a gate driving signal output terminal G1, and is configured to control the gate driving signal output terminal G1 to output the gate driving signal under the control of the potential of the first node PU1, a first input signal provided by the first input terminal I1 and a reset signal provided by the reset terminal R1, according to a first clock signal provided by the first clock signal terminal K1 and a first voltage signal provided by the first voltage terminal V1.

In the driving circuit described in the embodiment of the present disclosure, a gate driving circuit for generating a gate driving signal is added, and a signal obtained by performing an OR operation between the reset signal provided by the reset terminal R1 and the voltage signal of the first node PU1 in the current row is used for input/reset function, that is, the input function is realized when the reset signal and the voltage signal of the first node PU1 in the current row are simultaneously valid voltage signals, when the voltage signal of the first node PU1 in the current row is a valid voltage signal and the reset signal is invalid signal, the reset function is realized. When the first input signal provided by I1 is a valid voltage signal, the noise is removed for G1, so that the driving circuit according to the embodiment of the present disclosure can generate the gate driving signal while generating the light-emitting control signal, simplify the driving scheme, reduce the number of signals, and narrow the frame.

Figure 2:
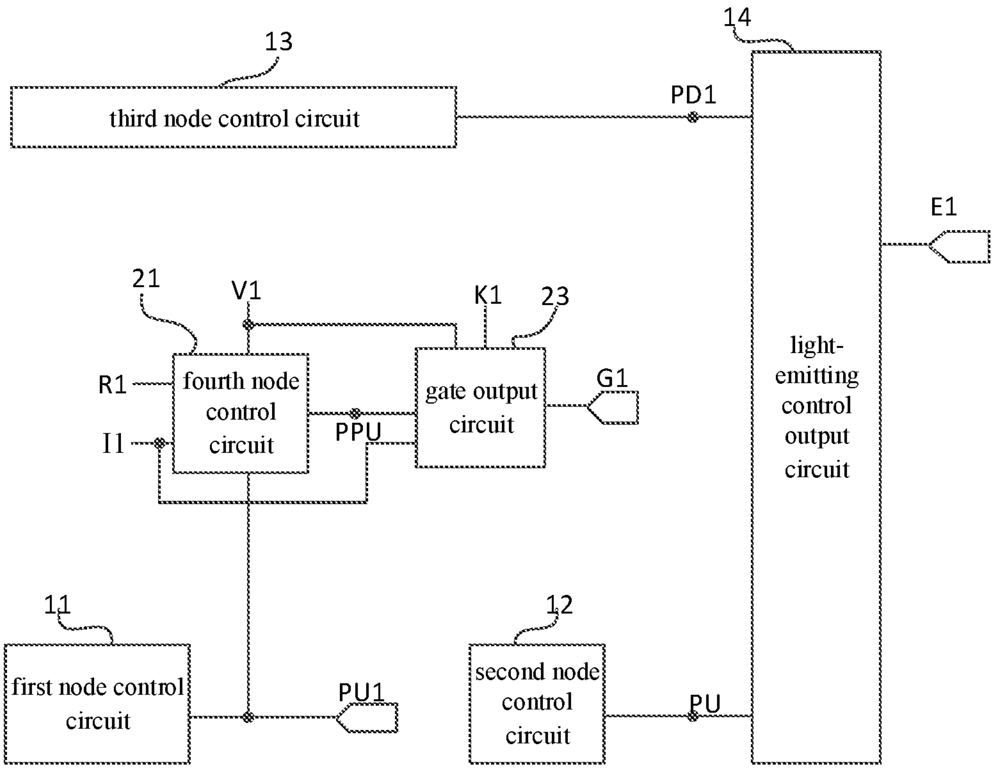
FIG. 2 is a structural diagram of a driving circuit according to at least one embodiment of the present disclosure.

As shown in FIG. 2, the driving circuit according to the embodiment of the present disclosure includes a light-emitting control signal generating circuit and a gate driving circuit; the light-emitting control signal generating circuit includes a first node control circuit 11, a second node control circuit 12, a third node control circuit 13 and a light-emitting control output circuit 14; the gate driving circuit includes a fourth node control circuit 21 and a gate output circuit 23;

The first node control circuit 11 is electrically connected to the first node PU1, and configured to control the potential of the first node PU1;

The second node control circuit 12 is electrically connected to the second node PU, and configured to control the potential of the second node PU;

The third node control circuit 13 is electrically connected to the third node PD1, and configured to control the potential of the third node PD1;

The light-emitting control output circuit 14 is electrically connected to the second node PU, the third node PD1 and the light-emitting control signal output terminal E1, and is used to control the light-emitting control signal output terminal E1 to output the light-emitting control signal according to the potential of the second node PU and the potential of the third node PD1;

The fourth node control circuit 21 is electrically connected to the first node PU1, the fourth node PPU, the reset terminal R1, the first input terminal I1 and the first voltage terminal V1, and is used to control to connect or disconnect the fourth node PPU and the reset terminal R1 under the control of the potential of the first node PU1, and control to connect or disconnect the fourth node PPU and the first voltage terminal V1 under the control of the first input signal provided by the first input terminal I1;

The gate output circuit 23 is electrically connected to the fourth node PPU, the gate driving signal output terminal G1, the first clock signal terminal K1, the first input terminal I1 and the first voltage terminal V1, and is configured to control to connect or disconnect the gate driving signal output terminal G1 and the first clock signal terminal K1 under the control of potential of the fourth node PPU, and control to connect or disconnect the gate driving signal output terminal G1 and the first voltage terminal V1 under the control of the first input signal proved by the first input terminal I1, and to control the gate driving signal provided by the gate driving signal output terminal G1 according to the potential of the fourth node PPU.

In the driving circuit described in the embodiment of the present disclosure, a gate driving circuit for generating a gate driving signal is added, and a signal obtained by performing an OR operation between the reset signal provided by the reset terminal R1 and the voltage signal of the first node PU1 in the current row is used for the input/reset function, that is, when the reset signal and the voltage signal of the first node PU1 in the current row are simultaneously valid voltage signals, the input function (input for the fourth node PPU) is realized. When the voltage signal of the first node PU1 in the current row is a valid voltage signal and the reset signal is an invalid voltage signal, the reset function (reset for the fourth node PPU) is realized. When the first input signal provided by I1 is a valid voltage signal, the fourth node PPU and G1 are denoised, so that the driving circuit described in the embodiments of the present disclosure can generate the gate driving signal while generating the light-emitting control signal, which can simplify the driving scheme, reduce the number of signals, and narrow the frame.

In at least one embodiment of the present disclosure, when each transistor included in the driving circuit is a p-type transistor, the valid voltage signal may be a low voltage signal, and the invalid voltage signal may be a high voltage signal; when each transistor included in the driving circuit is an n-type transistor, the valid voltage signal may be a high voltage signal, and the invalid voltage signal may be a low voltage signal.

When the driving circuit described in the embodiment of the present disclosure is in operation, the pulse width of the generated light-emitting control signal can be adjusted, the light-emitting control signal may be a valid signal under a low-voltage, and the generated gate driving signal may be a valid signal under a low-voltage. In addition, the time during which the potential of the light-emitting control signal continues to be a high voltage may be greater than or equal to 2H (the pulse width of the light-emitting control signal is adjustable), and the time during which the gate driving signal continues to be a low voltage may be less than or equal to 1H.

Among them, 1H is a charging time of one row of pixels in theory, 1H=1/frame refresh rate/number of rows.

Optionally, the first voltage terminal may be a high voltage terminal.

When the driving circuit shown in FIG. 2 of the present disclosure is in operation, the driving cycle may include a first input phase, a second input phase, a third input phase and a first reset phase which are set in sequence;

In the first input phase, under the control of the potential of the first node PU1, the fourth node control circuit 21 controls to disconnect the fourth node PPU from the reset terminal R1, and under the control of the first input signal, controls to disconnect the fourth node PPU from the first voltage terminal V1; under the control of the potential of the fourth node PPU, the gate output circuit 23 controls to disconnect the gate driving signal output terminal G1 from the first clock signal terminal K1, and controls to disconnect the gate driving signal output terminal G1 from the first voltage terminal V1 under the control of the first input signal, so that the gate driving signal output terminal G1 maintains outputting the first voltage signal;

In the second input phase, the fourth node control circuit 21 controls to connect the fourth node PPU and the reset terminal R1 under the control of the potential of the first node PU1; the gate output circuit 23 controls to connect the gate driving signal output terminal G1 and the first clock signal terminal K1 under the control of the potential of the fourth node PPU, so that the gate driving signal output terminal G1 outputs the first voltage signal;

In the third input phase, the fourth node control circuit 21 controls to disconnect the fourth node PPU from the reset terminal R1 under the control of the potential of the first node PU1; the gate output circuit 23 controls to connect the gate driving signal output terminal G1 and the first clock signal terminal K1 under the control of the potential of the fourth node PPU, so that the gate driving signal output terminal G1 outputs the second voltage signal;

In the first reset phase, under the control of the potential of the first node PU1, the fourth node control circuit 21 controls to connect the fourth node PPU and the reset terminal R1, and under the control of the first input signal, controls to connect the fourth node PPU and the first voltage terminal V1; the gate output circuit 23 controls to disconnect the gate driving signal output terminal G1 from the first clock signal terminal K1 under the control of the potential of the fourth node PPU, and controls to connect the gate driving signal output terminal G1 and the first voltage terminal V1 under the control of the first input signal, so that the gate driving signal output terminal G1 outputs the first voltage signal.

In at least one embodiment of the present disclosure, the first voltage signal may be a high voltage signal, and the second voltage signal may be a low voltage signal.

Optionally, the first input terminal may be electrically connected to the light-emitting control signal output terminal of an adjacent previous stage of driving circuit; or, the first input terminal of the driving circuit may be electrically connected to the light-emitting control signal output terminal of the driving circuit.

Optionally, the reset terminal of the driving circuit is electrically connected to the light-emitting control signal output terminal of an adjacent next stage of driving circuit; or, the reset terminal is electrically connected to the gate driving signal output terminal of an adjacent previous stage of driving circuit.

Figure 3:
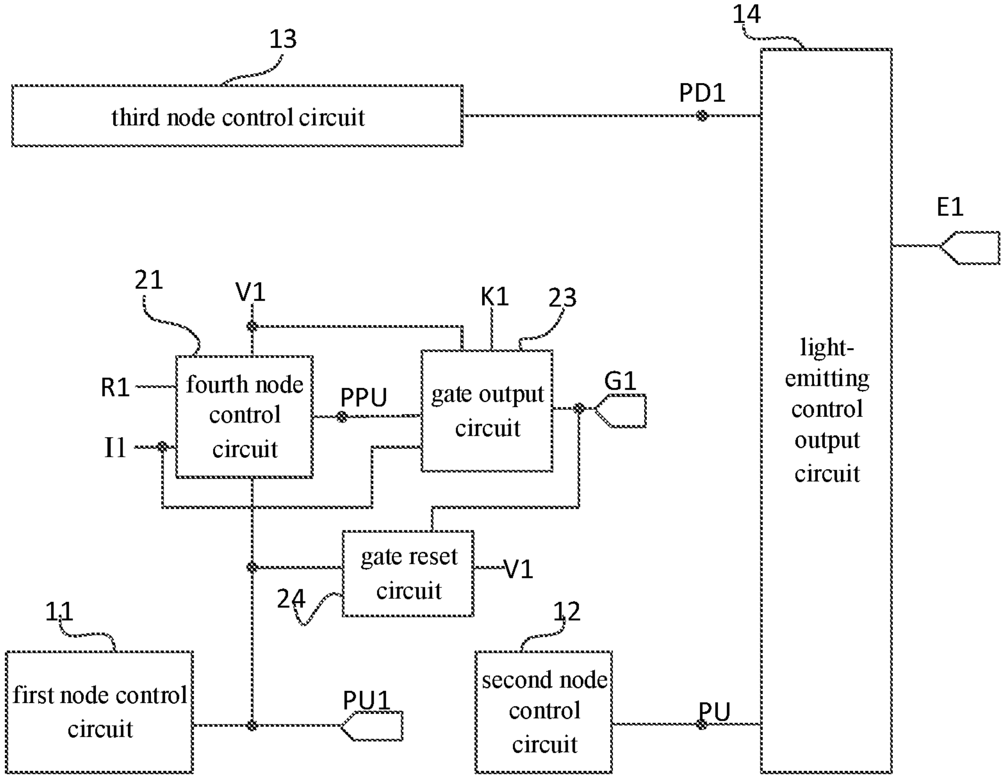
FIG. 3 is a structural diagram of a driving circuit according to at least one embodiment of the present disclosure.

As shown in FIG. 3, on the basis of the embodiment of the driving circuit shown in FIG. 2, the driving circuit described in at least one embodiment of the present disclosure may further include a gate reset circuit 24;

The gate reset circuit 24 is electrically connected to the first node PU1, the gate driving signal output terminal G1 and the first voltage terminal V1, and is configured to control to connect or disconnect the gate driving signal output terminal G1 and the first voltage terminal V1 under the control of the potential of the first node PU1.

In the specific implementation, in order to prevent the potential of the first input signal provided by I1 from continuing to be an invalid voltage for too long and unable to reset G1 in time, the gate reset circuit 24 is added to control the gate driving signal output terminal to output a first voltage signal under the control of the potential of the first node PU1, to reset G1.

During operation of at least one embodiment of the driving circuit shown in FIG. 3 of the present disclosure, In the first input phase, the gate reset circuit 24 controls to disconnect the gate driving signal output terminal G1 from the first voltage terminal V1 under the control of the potential of the first node PU1;

In the second input phase, the gate reset circuit 24 controls to connect the gate driving signal output terminal G1 and the first voltage terminal V1 under the control of the potential of the first node PU1;

In the third input phase, the gate reset circuit 24 controls to disconnect the gate driving signal output terminal G1 from the first voltage terminal V1 under the control of the potential of the first node PU1;

In the first reset phase, the gate reset circuit 24 controls to connect the gate driving signal output terminal G1 and the first voltage terminal V1 under the control of the potential of the first node PU1, to reset G1.

Optionally, the fourth node control circuit includes a first transistor and a second transistor;

A control electrode of the first transistor is electrically connected to the first node, a first electrode of the first transistor is electrically connected to the reset terminal, and a second electrode of the first transistor is electrically connected to the fourth node connect;

A control electrode of the second transistor is electrically connected to the first input terminal, a first electrode of the second transistor is electrically connected to the fourth node, and a second electrode of the second transistor is electrically connected to the first voltage terminal.

Optionally, the gate output circuit includes a third transistor, a fourth transistor and a first capacitor;

A control electrode of the third transistor is electrically connected to the fourth node, a first electrode of the third transistor is electrically connected to the first clock signal terminal, and a second electrode of the third transistor is electrically connected to the gate driving signal output terminal;

A control electrode of the fourth transistor is electrically connected to the first input terminal, a first electrode of the fourth transistor is electrically connected to the gate driving signal output terminal, and a second electrode of the fourth transistor is electrically connected to the first voltage terminal;

A first terminal of the first capacitor is electrically connected to the fourth node, and a second terminal of the first capacitor is electrically connected to the gate driving signal output terminal.

In at least one embodiment of the present disclosure, the first capacitor is used to couple the fourth node, so that the transistor whose control electrode is electrically connected to the fourth node is more fully turned on, thereby outputting a waveform to the gate driving signal output terminal.

Optionally, the gate reset circuit includes a fifth transistor;

A control electrode of the fifth transistor is electrically connected to the first node, a first electrode of the fifth transistor is electrically connected to the gate driving signal output terminal, and a second electrode of the fifth transistor is electrically connected to the first voltage terminal.

Figure 4:
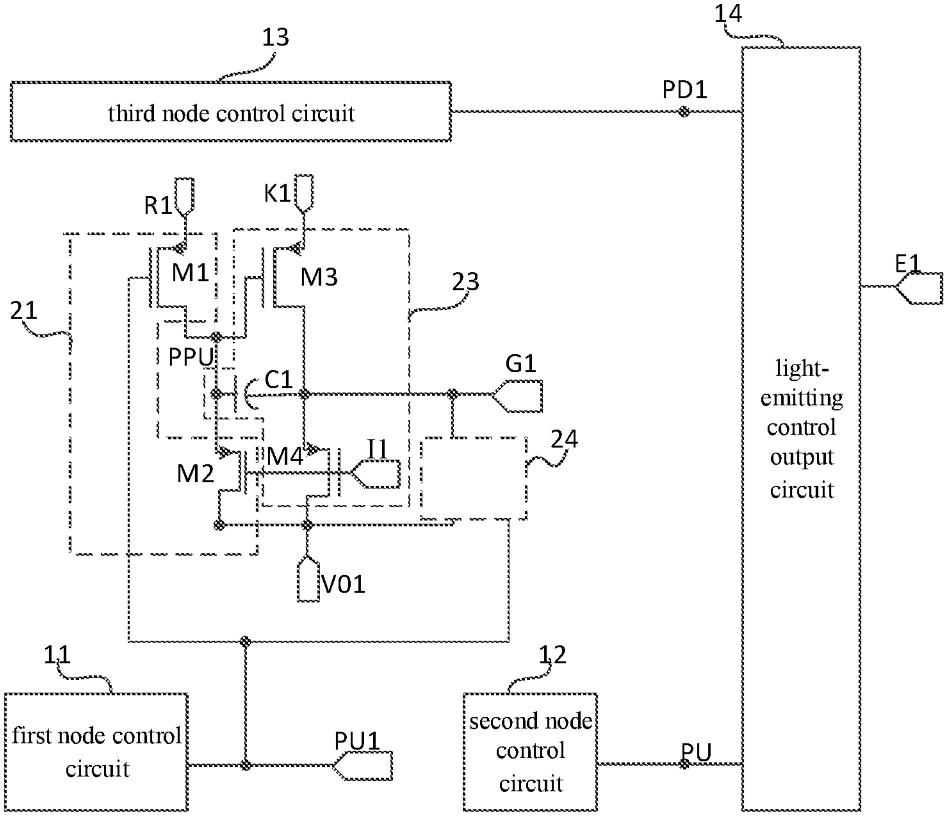
FIG. 4 is a structural diagram of a driving circuit according to at least one embodiment of the present disclosure.

As shown in FIG. 4, based on at least one embodiment of the driving circuit shown in FIG. 3, the fourth node control circuit 21 includes a first transistor M1 and a second transistor M2;

The gate electrode of the first transistor M1 is electrically connected to the first node PU1, the first electrode of the first transistor M1 is electrically connected to the reset terminal R1, and the second electrode of the first transistor M1 is electrically connected to the fourth node PPU;

The gate electrode of the second transistor M2 is electrically connected to the first input terminal I1, the first electrode of the second transistor M2 is electrically connected to the fourth node PPU, and the second electrode of the second transistor M2 is electrically connected to the high voltage terminal V01;

The gate output circuit 23 includes a third transistor M3, a fourth transistor M4 and a first capacitor C1;

The gate electrode of the third transistor M3 is electrically connected to the fourth node PPU, the first electrode of the third transistor M3 is electrically connected to the first clock signal terminal K1, and the second electrode of the third transistor M3 is electrically connected to the gate driving signal output terminal G1;

The gate electrode of the fourth transistor M4 is electrically connected to the first input terminal I1, the first electrode of the fourth transistor M4 is electrically connected to the gate driving signal output terminal G1, and the second electrode of the fourth transistor M4 is electrically connected to the high voltage terminal V01;

The gate reset circuit 24 includes a fifth transistor M5;

The gate electrode of the fifth transistor M5 is electrically connected to the first node PU1, the first electrode of the fifth transistor M5 is electrically connected to the gate driving signal output terminal G1, and the second electrode of the fifth transistor M5 is electrically connected to the high voltage terminal V01;

The first terminal of the first capacitor C1 is electrically connected to the fourth node PPU, and the second terminal of the first capacitor C1 is electrically connected to the gate driving signal output terminal G1.

In at least one embodiment of the driving circuit shown in FIG. 4, each transistor is a p-type transistor.

Figure 5:
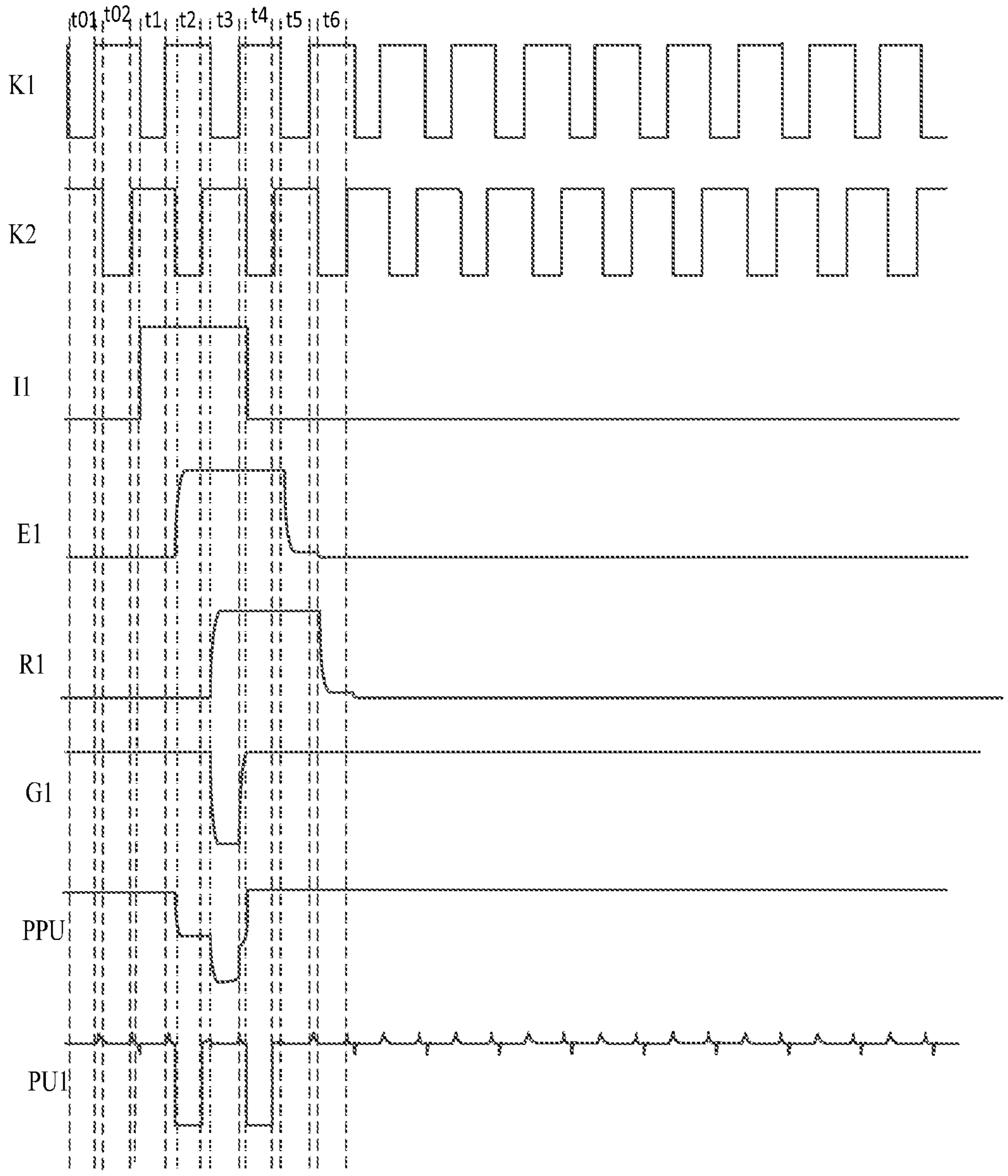
FIG. 5 is a working timing diagram of the driving circuit shown in FIG. 4.

As shown in FIG. 5, during operation of the driving circuit shown in FIG. 4 of the present disclosure, the driving cycle includes a first preparation phase t01, a second preparation phase t02, a first input phase t1, a second input phase t2, a third input phase t3, a first reset phase t4, a second reset phase t5 and a third reset phase t6;

In the first preparation phase t01, K1 provides a low voltage signal, I1 provides a low voltage signal, R1 provides a low voltage signal, the potential of PU1 is a high voltage, the potential of PPU is a high voltage, M1 is turned off, M2 is turned on, M3 is turned off, M4 is turned on, M5 is turned off, and G1 outputs a high voltage signal;

In the second preparation phase t01, K1 provides a high voltage signal, I1 provides a low voltage signal, R1 provides a low voltage signal, the potential of PU1 is a high voltage, the potential of PPU is a high voltage, M1 is turned off, M2 is turned on, M3 is turned off, M4 is turned on, M5 is turned off, and G1 outputs a high voltage signal;

In the first input phase t1, K1 provides a low voltage signal, I1 provides a high voltage signal, R1 provides a low voltage signal, the potential of PU1 is a high voltage, the potential of PPU is a high voltage, M1, M2, M3, M4 and M5 are all turned off, G1 continues to output a high voltage signal;

In the second input phase t2, K1 provides a high voltage signal, I1 provides a high voltage signal, R1 provides a low voltage signal, the potential of PU1 is a low voltage, the potential of PPU is pulled down, M1 is turned on, M2 is turned off, M3 is turned on, and M4 is turned off, M5 is turned on, G1 provides a high voltage signal;

In the third input phase t3, K1 provides a low voltage signal, I1 provides a high voltage signal, R1 provides a high voltage signal, the potential of PU1 is a high voltage, the potential of PPU is further pulled down, M1 and M2 are turned off, M3 is turned on, and M4 is turned off, M5 is turned off, G1 provides a low voltage signal;

In the first reset phase t4, K1 provides a high voltage signal, I1 provides a low voltage signal, R1 provides a high voltage signal, the potential of PU1 is a low voltage, the potential of PPU is a high voltage, M1 and M2 are turned on, M3 is turned off, and M4 is turned on, M5 is turned on, G1 provides a high voltage signal to reset G1;

In the second reset phase t5, K1 provides a low voltage signal, I1 provides a low voltage signal, R1 provides a high voltage signal, the potential of PU1 is a high voltage, the potential of PPU is a high voltage, M1 is turned off, M2 is turned on, M3 is turned off, M4 is turned on, M5 is turned off, and G1 provides a high voltage signal;

In the third reset phase t6, K1 provides a high voltage signal, I1 provides a low voltage signal, R1 provides a low voltage signal, the potential of PU1 is a high voltage, the potential of PPU is a high voltage, M1 is turned off, M2 is turned on, M3 is turned off, M4 is turned on, M5 is turned off, and G1 provides a high voltage signal.

As shown in FIG. 5, the time during which the potential of the light-emitting control signal provided by E1 is kept at a high voltage is 3H, and the time during which the potential of the gate driving signal provided by G1 is kept at a low voltage is 1H.

The light-emitting control signal and the gate driving signal shown in FIG. 5 are the driving signals in practical application, and the duty cycle is less than 50%. The effective width is less than 1H, and the period is 2H, so the duty cycle is less than 50%, resulting in separating the gaps between the phases by dotted lines.

Figure 6:
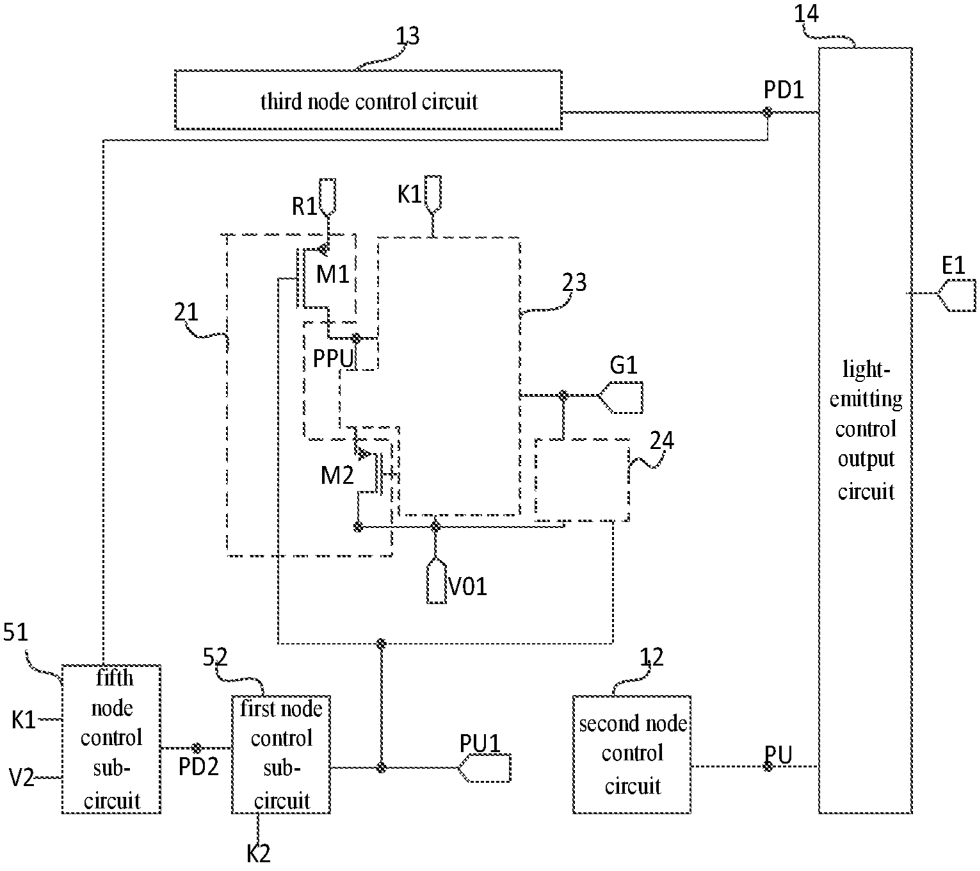
FIG. 6 is a structural diagram of a driving circuit according to at least one embodiment of the present disclosure.

In at least one embodiment of the present disclosure, as shown in FIG. 6, on the basis of at least one embodiment of the driving circuit shown in FIG. 4, the first node control circuit may include a fifth node control sub-circuit 51 and a first node control sub-circuit 52;

The fifth node control sub-circuit 51 is electrically connected to the first clock signal terminal K1, a fifth node PD2, a second voltage terminal V2 and a third node PD1, and is configured to control to connect or disconnect the fifth node PD2 and the second voltage terminal V2 under the control of the first clock signal provided by the first clock signal terminal K1, and control to connect or disconnect the fifth node PD2 and the first clock signal terminal K1 under the control of the potential of the third node PD1;

The first node control sub-circuit 52 is electrically connected to the fifth node PD2, the second clock signal terminal K2 and the first node PU1, and is configured to control used to the potential of the first node PU1 according to the potential of the fifth node PD2 and the second clock signal terminal K2.

In at least one embodiment of the present disclosure, the first node control sub-circuit 52 may be configured to control to connect or disconnect the first node PU1 and the second clock signal terminal K2 under the control of the potential of the fifth node PD2 and control the potential of the first node PU1 according to the potential of the fifth node PD2.

Optionally, the fifth node control sub-circuit includes a sixth transistor and a seventh transistor;

A control electrode of the sixth transistor is electrically connected to the first clock signal terminal, a first electrode of the sixth transistor is electrically connected to the second voltage terminal, and a second electrode of the sixth transistor is electrically connected to the fifth node;

A control electrode of the seventh transistor is electrically connected to the third node, a first electrode of the seventh transistor is electrically connected to the first clock signal terminal, and a second electrode of the seventh transistor is electrically connected to the fifth node.

Optionally, the first node control sub-circuit includes an eighth transistor and a second capacitor;

A control electrode of the eighth transistor is electrically connected to the fifth node, a first electrode of the eighth transistor is electrically connected to the second clock signal terminal, and a second electrode of the eighth transistor is electrically connected to the first node;

A first terminal of the second capacitor is electrically connected to the fifth node, and a second terminal of the second capacitor is electrically connected to the first node.

The driving circuit according to at least one embodiment of the present disclosure may further include a conduction control circuit; the conduction control circuit is configured to control to connect or disconnect the fifth node and the sixth node under the control of the second voltage signal provided by the second voltage terminal;

The first node control sub-circuit is used to control to connect or disconnect the first node and the second clock signal terminal under the control of the potential of the sixth node, and is configured to control the potential of the first node according to the potential of the sixth node.

During specific implementation, the driving circuit described in at least one embodiment of the present disclosure may include a conduction control circuit, the conduction control circuit controls to connect or disconnect the fifth node and the sixth node, and the first node control sub-circuit is configured to control the potential of the first node under the control of the potential of the sixth node.

Figure 7:
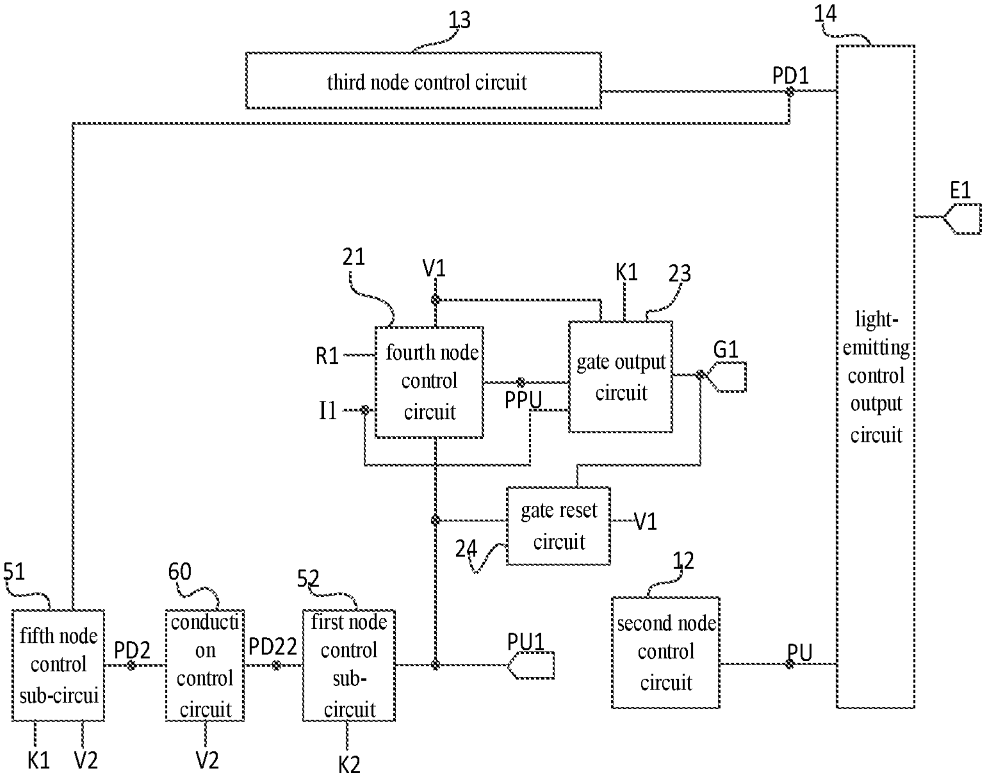
FIG. 7 is a structural diagram of a driving circuit according to at least one embodiment of the present disclosure.

As shown in FIG. 7, on the basis of at least one embodiment of the driving circuit shown in FIG. 3, the driving circuit according to at least one embodiment of the present disclosure may further include a conduction control circuit 60; the first node control circuit may include a fifth node control sub-circuit 51 and a first node control sub-circuit 52;

The conduction control circuit 60 is electrically connected to the second voltage terminal V2, the fifth node PD2 and the sixth node PD22, and is configured to control to connect or disconnect the fifth node PD2 and the sixth node PD22 under the control of the second voltage signal provided by the second voltage terminal V2;

The fifth node control sub-circuit 51 is electrically connected to the first clock signal terminal K1, the fifth node PD2, the second voltage terminal V2 and the third node PD1, and is configured to control to connect or disconnect the fifth node PD2 and the second voltage terminal V2 under the control of the first clock signal provided by the first clock signal terminal K1, and control to connect or disconnect the fifth node PD2 and the first clock signal terminal K1 under the control of the potential of the third node PD1;

The first node control sub-circuit 52 is electrically connected to the sixth node PD22, the first node PU1 and the second clock signal terminal K2, and is used to control to connect or disconnect the first node PU1 and the second clock signal terminal K2 under the control of the potential of the sixth node PD22, and is used to control the potential of the first node PU1 according to the potential of the sixth node PD22.

In at least one embodiment of the driving circuit shown in FIG. 7, the conduction control circuit 60 controls to connect or disconnect PD2 and PD22 under the control of the second voltage signal, and the fifth node control sub-circuit 51 controls the potential of the fifth node PD2, the first node control sub-circuit 52 controls the potential of the first node PU1.

Optionally, the first node control sub-circuit includes an eighth transistor and a second capacitor, and the conduction control circuit includes a first conduction control transistor;

A control electrode of the first conduction control transistor is electrically connected to the second voltage terminal, a first electrode of the first conduction control transistor is electrically connected to the fifth node, and a second electrode of the first conduction control transistor electrically connected to the sixth node;

A control electrode of the eighth transistor is electrically connected to the sixth node, a first electrode of the eighth transistor is electrically connected to the second clock signal terminal, and a second electrode of the eighth transistor is electrically connected to the first node;

A first terminal of the second capacitor is electrically connected to the sixth node, and a second terminal of the second capacitor is electrically connected to the first node.

In at least one embodiment of the present disclosure, the second node control circuit is electrically connected to the second clock signal terminal K2, the first node PU1, the second node PU, the third node PD1 and the first voltage terminal V1, is configured to control to connect or disconnect the first node PU1 and the second node PU under the control of the second clock signal provided by the second clock signal terminal K2, and is configured to control to connect or disconnect the second node PU and the first voltage terminal V1 under the control of the potential of the third node PD1, and maintain the potential of the second node PU.

Optionally, the second node control circuit includes a ninth transistor, a tenth transistor and a control capacitor;

A control electrode of the ninth transistor is electrically connected to the second clock signal terminal, a first electrode of the ninth transistor is electrically connected to the first node, and a second electrode of the ninth transistor is electrically connected to the second node;

A control electrode of the tenth transistor is electrically connected to the third node, a first electrode of the tenth transistor is electrically connected to the first voltage terminal, and a second electrode of the tenth transistor is electrically connected to the second node;

A first terminal of the control capacitor is electrically connected to the second node, and a second terminal of the control capacitor is connected to the first voltage terminal.

In at least one embodiment of the present disclosure, as shown in FIG. 7, the third node control circuit is connected to the first clock signal terminal K1, the third node PD1, the second input terminal I2, the fifth node PD2, the second clock signal terminal K1 and the first voltage terminal V1, and is used to control to connect or disconnect the third node PD1 and the second input terminal I2 under the control of the first clock signal provided by the first clock signal terminal K1, and control to connect or disconnect the third node PD1 and the first voltage terminal V1 under the control of the potential of the fifth node PD2 and the second clock signal terminal K2, and is used to control the potential of the third node PD1 according to the second clock signal.

Optionally, the third node control circuit includes an eleventh transistor, a twelfth transistor, a thirteenth transistor and a third capacitor;

A control electrode of the eleventh transistor is electrically connected to the first clock signal terminal, a first electrode of the eleventh transistor is electrically connected to the second input terminal, and a second electrode of the eleventh transistor is electrically connected to the third node;

A control electrode of the twelfth transistor is electrically connected to the fifth node, and a first electrode of the twelfth transistor is electrically connected to the first voltage terminal;

A control electrode of the thirteenth transistor is electrically connected to the second clock signal terminal, a first electrode of the thirteenth transistor is electrically connected to a second electrode of the twelfth transistor, and a second electrode of the thirteenth transistor is electrically connected to the third node;

A first terminal of the third capacitor is electrically connected to the second clock signal terminal, and a second terminal of the third capacitor is electrically connected to the third node.

Figure 8:
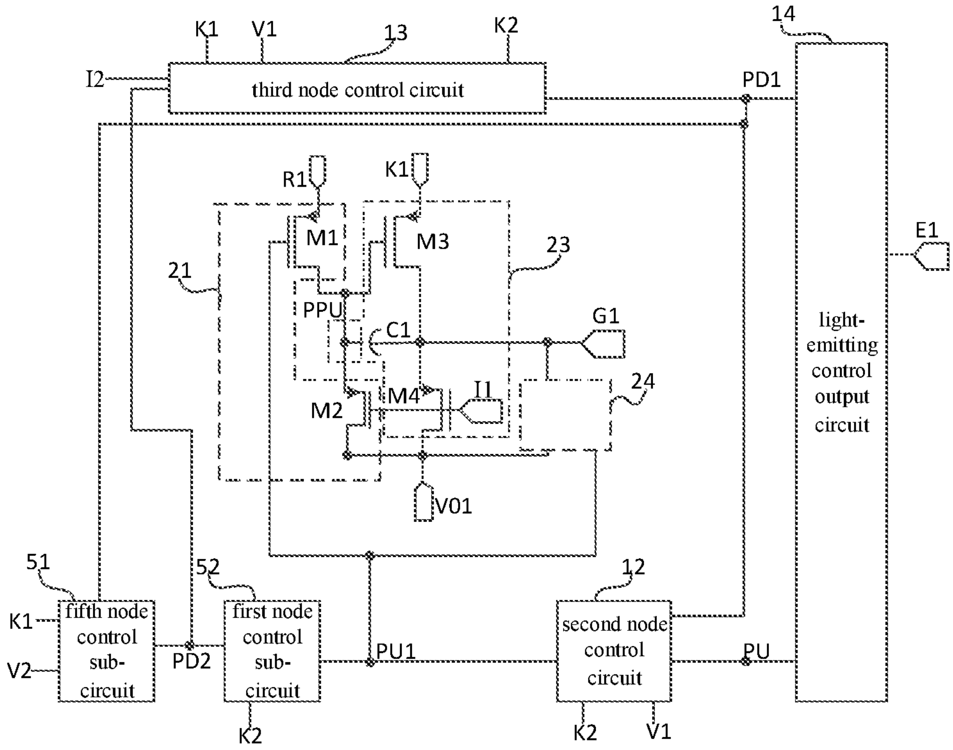
FIG. 8 is a structural diagram of a driving circuit according to at least one embodiment of the present disclosure.

As shown in FIG. 8, based on at least one embodiment of the driving circuit shown in FIG. 6, the second node control circuit 12 is electrically connected to the second clock signal terminal K2, the first node PU1, the second node PU, the third node PD1 and the first voltage terminal V1, and is used to control to connect or disconnect the first node PU1 and the second node PU under the control of the second clock signal provided by the second clock signal terminal K2, and used to control the to connect or disconnect the second node PU and the first voltage terminal V1 under the control of the potential of the third node PD1;

The third node control circuit 13 is electrically connected to the first clock signal terminal K1, the third node PD1, the second input terminal I2, the fifth node PD2, the second clock signal terminal K2 and the first voltage terminal V1, and is configured to connect or disconnect the third node PD1 and the second input terminal I2 under the control of the first clock signal provided by the first clock signal terminal K1, and control to connect or disconnect the third node PD1 and the first voltage terminal V1 under the control of the potential of the fifth node PD2 and the second clock signal provided by the second clock signal terminal K2, and control the potential of the third node PD1 according to the second clock signal.

In at least one embodiment of the driving circuit shown in FIG. 8, the second node control circuit 12 controls the potential of the second node PU, and the third node control circuit 13 controls the potential of the third node PD1.

In at least one embodiment of the present disclosure, the third node control circuit may include a seventh node control sub-circuit and a third node control sub-circuit;

The seventh node control sub-circuit is used to control to connect or disconnect the seventh node and the first voltage terminal under the control of the potential of the fifth node, and to control to connect or disconnect the seventh node and the second clock signal terminal under the control of the potential of the third node;

The third node control sub-circuit is used to control the potential of the third node according to the potential of the seventh node, and control to connect or disconnect the third node and the second input terminal under the control of the first clock signal provided by the first clock signal terminal.

Optionally, the third node control sub-circuit includes an eleventh transistor and a third capacitor;

The seventh node control sub-circuit includes a twelfth transistor and a thirteenth transistor;

A control electrode of the eleventh transistor is electrically connected to the first clock signal terminal, a first electrode of the eleventh transistor is electrically connected to the second input terminal, and a second electrode of the eleventh transistor is electrically connected to the third node;

A control electrode of the twelfth transistor is electrically connected to the fifth node, a first electrode of the twelfth transistor is electrically connected to the first voltage terminal, and a second electrode of the twelfth transistor is electrically connected to the seventh node;

A control electrode of the thirteenth transistor is electrically connected to the third node, a first electrode of the thirteenth transistor is electrically connected to the second clock signal terminal, and a second electrode of the thirteenth transistor is electrically connected to the seventh node;

A first terminal of the third capacitor is electrically connected to the seventh node, and a second terminal of the third capacitor is electrically connected to the third node.

Optionally, the light-emitting control output circuit includes a first output transistor and a second output transistor;

A control electrode of the first output transistor is electrically connected to the third node, a first electrode of the first output transistor is electrically connected to the second voltage terminal, and a second electrode of the first output transistor is electrically connected to the light-emitting control signal output terminal;

A control electrode of the second output transistor is electrically connected to the second node, a first electrode of the second output transistor is electrically connected to the light-emitting control signal output terminal, and a second electrode of the second output transistor is electrically connected to the first voltage terminal.

Figure 9:
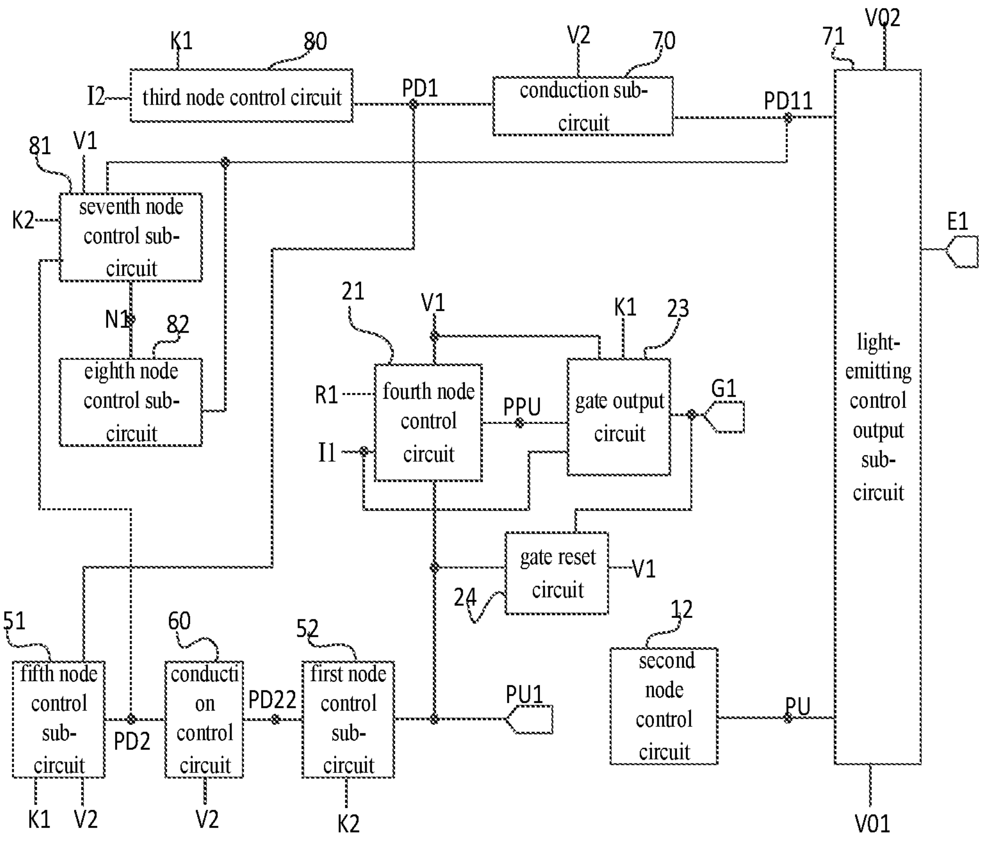
FIG. 9 is a structural diagram of a driving circuit according to at least one embodiment of the present disclosure.

As shown in FIG. 9, on the basis of at least one embodiment of the driving circuit shown in FIG. 7, the light-emitting control output circuit may include a conduction sub-circuit 70 and a light-emitting control output sub-circuit 71; the third node control circuit includes a third node control sub-circuit 80, a seventh node control sub-circuit 81 and an eighth node control sub-circuit 82;

The conduction sub-circuit 70 is electrically connected to the first voltage terminal V2, the third node PD1 and the eighth node PD11, and is used to control to connect or disconnect the third node PD1 and the eighth node PD11 under the control of the second voltage signal provided by the first voltage terminal V2;

The light-emitting control output sub-circuit 71 is electrically connected to the second node PU, the eighth node PD11, the light-emitting control signal output terminal E1, the high voltage terminal V01 and the low voltage terminal V02, is configured to control to connect or disconnect the light-emitting control signal output terminal E1 and the low-voltage terminal V02 under the control of the potential of the eighth node PD11, and control to connect or disconnect the light-emitting control signal output terminal E1 and the high-voltage terminal V01 under the control of the potential of the second node PU;

The third node control sub-circuit 80 is electrically connected to the first clock signal terminal K1, the second input terminal I2 and the third node PD1, and is configured to control to connect or disconnect the second input terminal I2 and the third node PD1 under the control of the first clock signal provided by the first clock signal terminal K1;

The seventh node control sub-circuit 81 is electrically connected to the fifth node PD2, the eighth node PD11, the seventh node N1, the first voltage terminal V1 and the second clock signal terminal K2, and is configured to control to connect or disconnect the seventh node N1 and the first voltage terminal V1 under the control of the potential of the fifth node PD2, and control to connect or disconnect the seventh node N1 and the second clock signal terminal K2 under the control of the potential of the eighth node PD11;

The eighth node control sub-circuit 82 is electrically connected to the seventh node N1 and the eighth node PD11, and is used to control the potential of the eighth node PD11 according to the potential of the seventh node N1.

In at least one embodiment of the driving circuit shown in FIG. 9, the conduction sub-circuit 70 controls to connect or disconnect PD1 and PD11 under the control of the second voltage signal, and the third node control sub-circuit 81 controls the potential of the third node PD1, the seventh node control sub-circuit 81 controls the potential of the seventh node N1, and the eighth node control sub-circuit 82 controls the potential of the eighth node PD11.

Optionally, the conduction sub-circuit includes a second conduction control transistor, the third node control sub-circuit includes an eleventh transistor, and the seventh node control sub-circuit includes a twelfth transistor and a thirteenth transistor; the eighth node control sub-circuit includes a third capacitor;

A control electrode of the second conduction control transistor is electrically connected to the second voltage terminal, a first electrode of the second conduction control transistor is electrically connected to the third node, and a second electrode of the second conduction control transistor is electrically connected to the eighth node;

A control electrode of the eleventh transistor is electrically connected to the first clock signal terminal, a first electrode of the eleventh transistor is electrically connected to the second input terminal, and a second electrode of the eleventh transistor is electrically connected to the third node;

A control electrode of the twelfth transistor is electrically connected to the fifth node, a first electrode of the twelfth transistor is electrically connected to the first voltage terminal, and a second electrode of the twelfth transistor is electrically connected to the seventh node;

A control electrode of the thirteenth transistor is electrically connected to the eighth node, a first electrode of the thirteenth transistor is electrically connected to the second clock signal terminal, and a second electrode of the thirteenth transistor is electrically connected to the seventh node;

A first terminal of the third capacitor is electrically connected to the seventh node, and a second terminal of the third capacitor is electrically connected to the eighth node.

Optionally, the light-emitting control output circuit includes a second conduction control transistor, a first output transistor and a second output transistor;

A control electrode of the second conduction control transistor is electrically connected to the second voltage terminal, a first electrode of the second conduction control transistor is electrically connected to the third node, and a second electrode of the second conduction control transistor is electrically connected to the eighth node;

A control electrode of the first output transistor is electrically connected to the eighth node, a first electrode of the first output transistor is electrically connected to the second voltage terminal, and a second electrode of the first output transistor is electrically connected to the light-emitting control signal output terminal;

A control electrode of the second output transistor is electrically connected to the second node, a first electrode of the second output transistor is electrically connected to the light-emitting control signal output terminal, and a second electrode of the second output transistor is electrically connected to the first voltage terminal.

Figure 10:
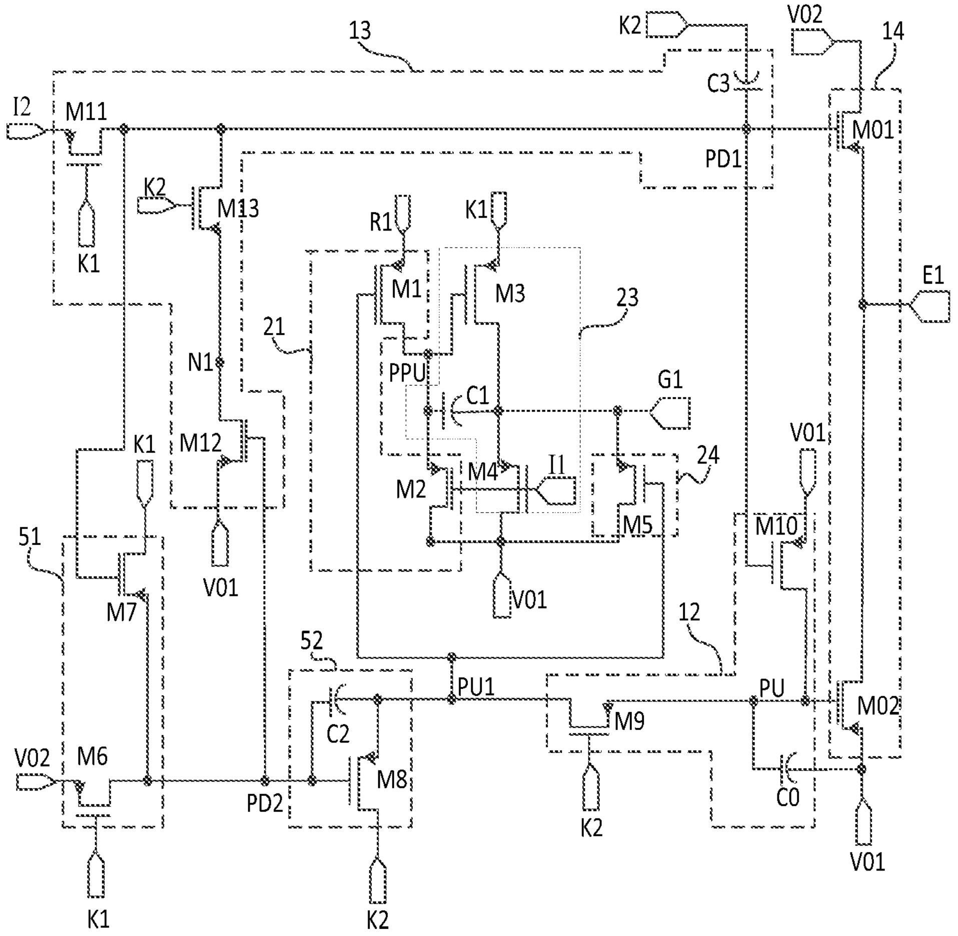
FIG. 10 is a circuit diagram of a driving circuit according to at least one embodiment of the present disclosure.

As shown in FIG. 10, in the driving circuit described in at least one embodiment of the present disclosure, on the basis of at least one embodiment of the driving circuit shown in FIG. 8, The fifth node control sub-circuit 51 includes a sixth transistor M6 and a seventh transistor M7;

The gate electrode of the sixth transistor M6 is electrically connected to the first clock signal terminal K1, the first electrode of the sixth transistor M6 is electrically connected to the low voltage terminal V02, and the second electrode of the sixth transistor M6 is electrically connected to the fifth Node PD2;

The gate electrode of the seventh transistor M7 is electrically connected to the third node PD1, the first electrode of the seventh transistor M7 is electrically connected to the first clock signal terminal K1, and the second electrode of the seventh transistor M7 is electrically connected to the fifth Node PD2;

The first node control sub-circuit 52 includes an eighth transistor M8 and a second capacitor C2;

The gate electrode of the eighth transistor M8 is electrically connected to the fifth node PD2, the first electrode of the eighth transistor M8 is electrically connected to the second clock signal terminal K2, and the second electrode of the eighth transistor M8 is electrically connected to the first node PU1;

The first terminal of the second capacitor C2 is electrically connected to the fifth node PD2, and the second terminal of the second capacitor C2 is electrically connected to the first node PU1;

The second node control circuit 12 includes a ninth transistor M9, a tenth transistor M10 and a control capacitor C0;

The gate electrode of the ninth transistor M9 is electrically connected to the second clock signal terminal K2, the first electrode of the ninth transistor M9 is electrically connected to the first node PU1, and the second electrode of the ninth transistor M9 is electrically connected to the second node PU;

The gate electrode of the tenth transistor M10 is electrically connected to the third node PD1, the first electrode of the tenth transistor M10 is electrically connected to the high voltage terminal V01, and the second electrode of the tenth transistor M10 is electrically connected to the second node PU;

The first terminal of the control capacitor C0 is electrically connected to the second node PU, and the second terminal of the control capacitor C0 is electrically connected to the high voltage terminal V01;

The third node control circuit 13 includes an eleventh transistor M11, a twelfth transistor M12, a thirteenth transistor M13 and a third capacitor C3;

The gate electrode of the eleventh transistor M11 is electrically connected to the first clock signal terminal K1, the first electrode of the eleventh transistor M11 is electrically connected to the second input terminal I2, and the second electrode of the eleventh transistor M11 is electrically connected to the third node PD1;

The gate electrode of the twelfth transistor M12 is electrically connected to the fifth node PD2, and the first electrode of the twelfth transistor M12 is electrically connected to the high voltage terminal V01;

The gate electrode of the thirteenth transistor M13 is electrically connected to the second clock signal terminal K2, the first electrode of the thirteenth transistor M13 is electrically connected to the second electrode of the twelfth transistor M12, and the second electrode of the thirteenth transistor M13 is electrically connected to the third node PD1;

The first terminal of the third capacitor C3 is electrically connected to the second clock signal terminal K2, and the second terminal of the third capacitor C3 is electrically connected to the third node PD1;

The light-emitting control output circuit 14 includes a first output transistor M01 and a second output transistor M02;

The gate electrode of the first output transistor M01 is electrically connected to the third node PD1, the first electrode of the first output transistor M01 is electrically connected to the low voltage terminal V02, and the second electrode of the first output transistor M01 is electrically connected to the light-emitting control signal output terminal E1;

The gate electrode of the second output transistor M02 is electrically connected to the second node PU, the first electrode of the second output transistor M02 is electrically connected to the light-emitting control signal output terminal E1, and the second electrode of the second output transistor M02 is electrically connected to the high voltage terminal V02.

In at least one embodiment of the driving circuit shown in FIG. 10, both I1 and I2 are electrically connected to the light-emitting control signal output terminal of an adjacent previous stage of driving circuit, and R1 is electrically connected to the light-emitting control signal output terminal of an adjacent next stage of driving circuit.

Optionally, I1 can be replaced to be electrically connected to the light-emitting control signal output terminal of the driving circuit.

Optionally, R1 can be replaced to be electrically connected to the gate driving signal output terminal of the adjacent previous stage of driving circuit.

In at least one embodiment of the driving circuit shown in FIG. 10, all transistors are p-type transistors, but not limited thereto.

Figure 11:
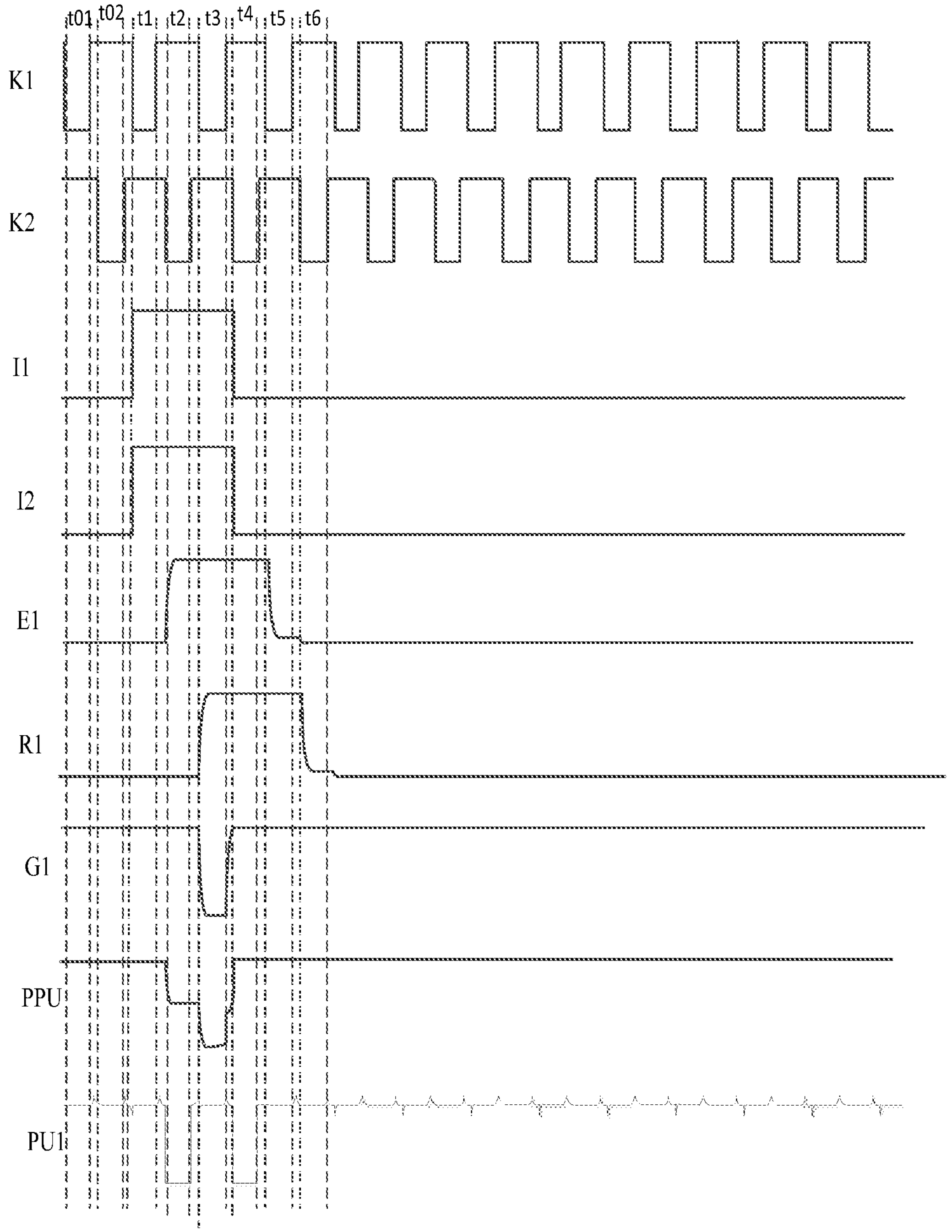
FIG. 11 is a working timing diagram of the driving circuit shown in FIG. 10 of the present disclosure.
Figure 12A:
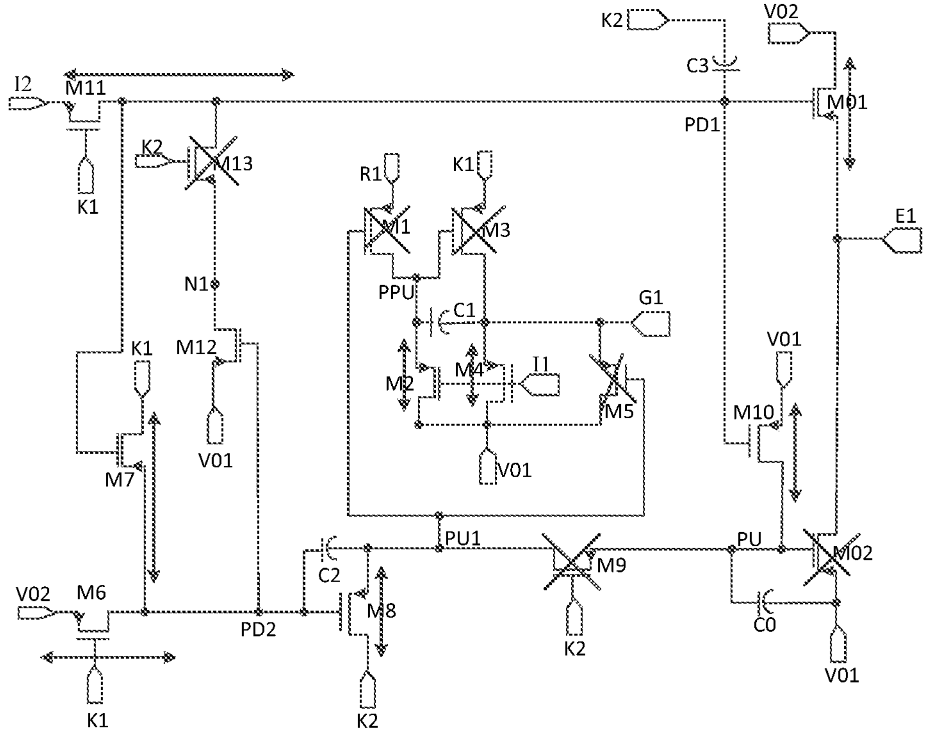
FIG. 12A is a schematic diagram of a working state of the driving circuit shown in FIG. 10 in a first preparation phase t01.
Figure 12B:
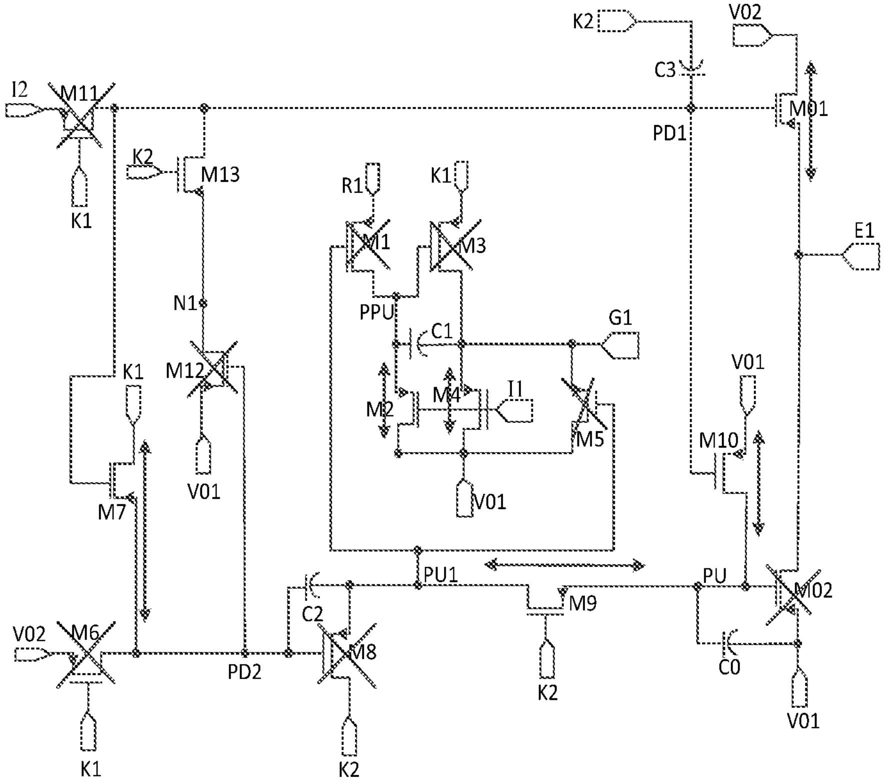
FIG. 12B is a schematic diagram of a working state of the driving circuit shown in FIG. 10 in the second preparation phase t02.
Figure 12C:
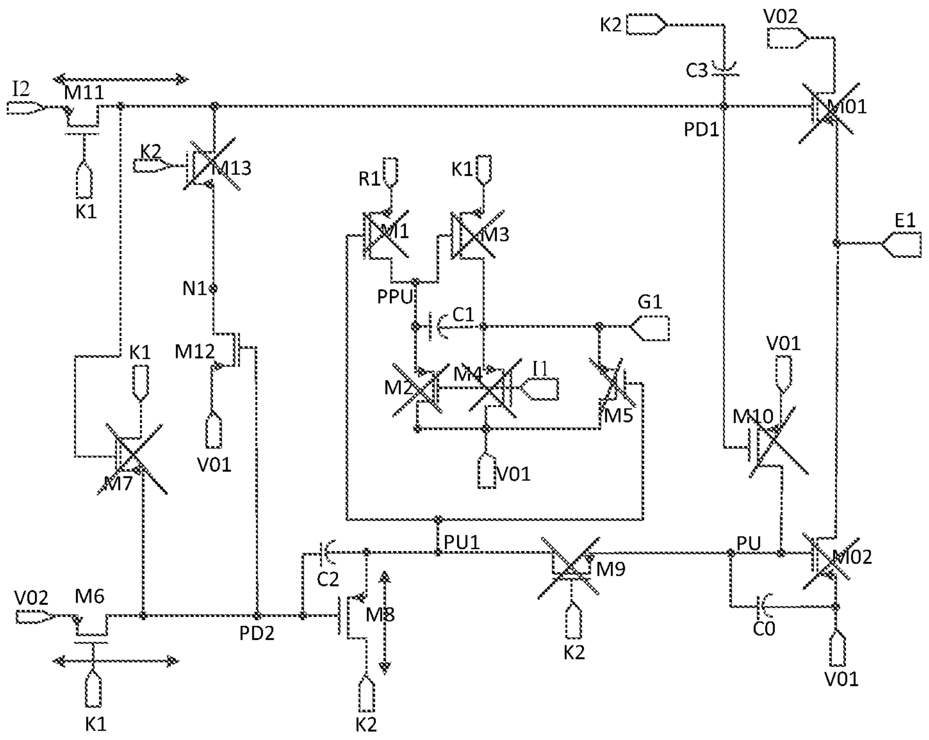
FIG. 12C is a schematic diagram of a working state of the driving circuit shown in FIG. 10 in the first input phase t1.
Figure 12D:
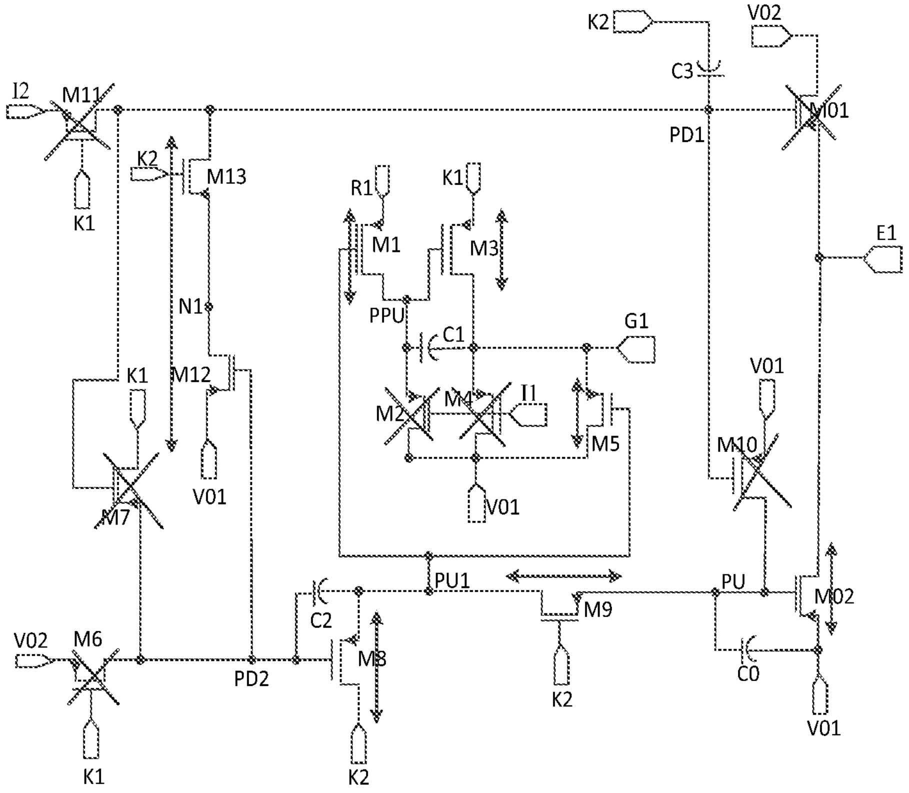
FIG. 12D is a schematic diagram of a working state of the driving circuit shown in FIG. 10 in the second input phase t2.
Figure 12E:
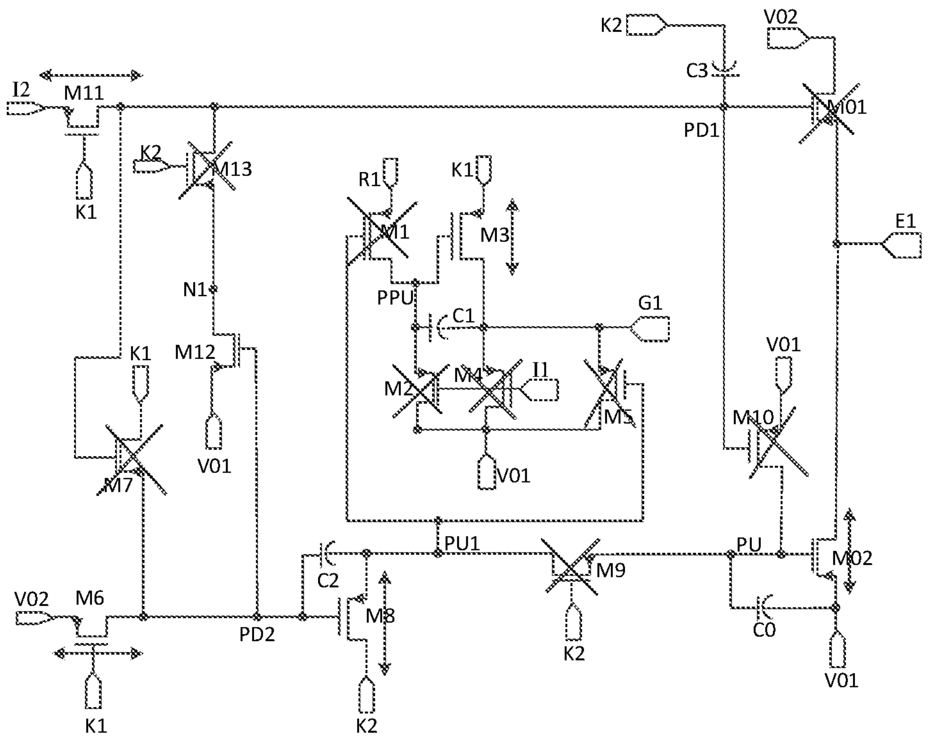
FIG. 12E is a schematic diagram of a working state of the driving circuit shown in FIG. 10 in a third input phase t3.
Figure 12F:
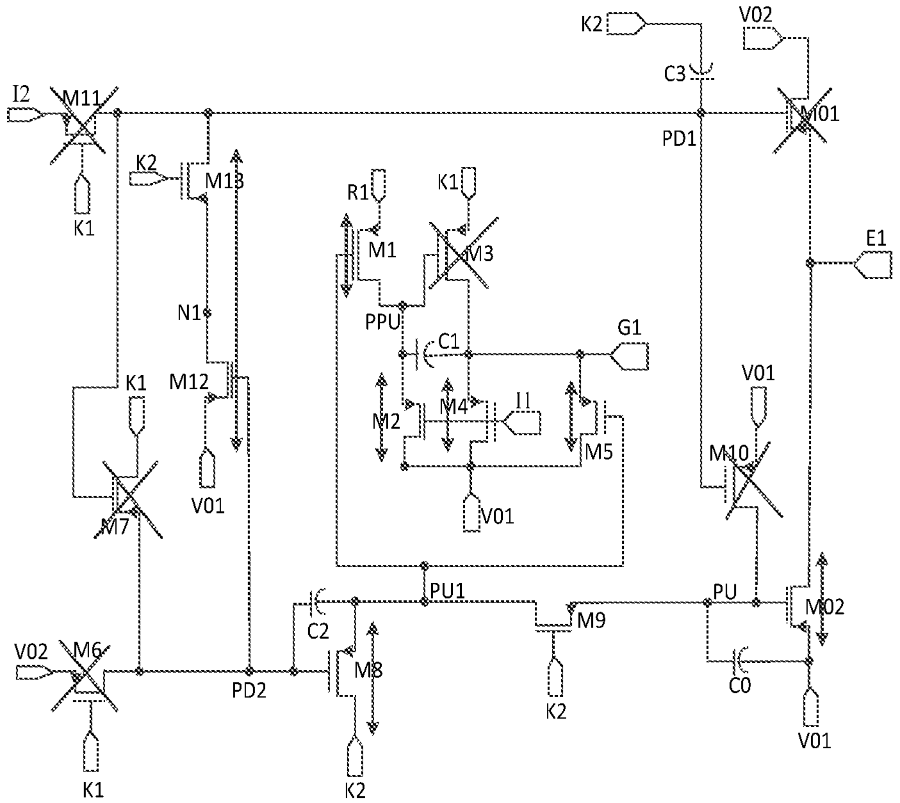
FIG. 12F is a schematic diagram of a working state of the driving circuit shown in FIG. 10 in the first reset phase t4.
Figure 12G:
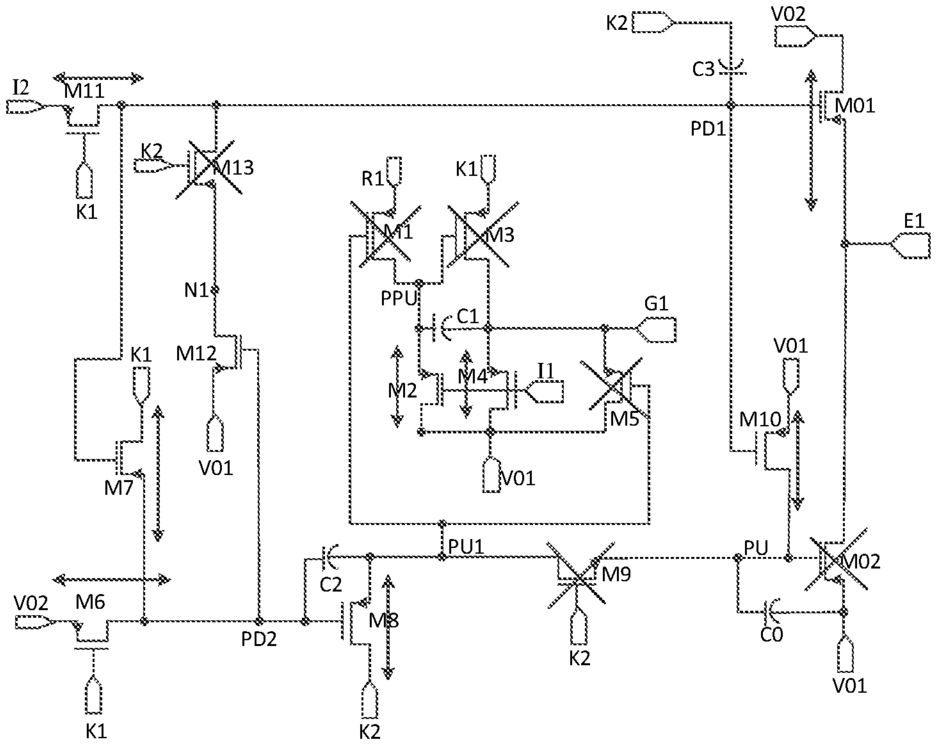
FIG. 12G is a schematic diagram of a working state of the driving circuit shown in FIG. 10 in the second reset phase t5.
Figure 12H:
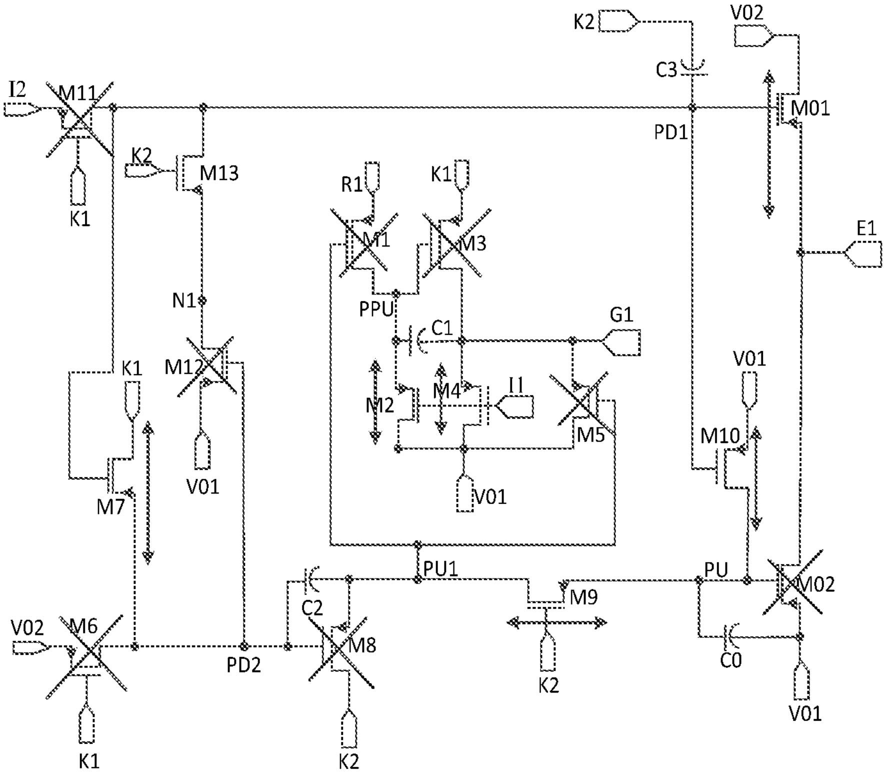
FIG. 12H is a schematic diagram of a working state of the driving circuit shown in FIG. 10 in the third reset phase t6.

As shown in FIG. 11, when at least one embodiment of the driving circuit shown in FIG. 10 is in operation, the driving cycle includes a first preparation phase t01, a second preparation phase t02, a first input phase t1, a second input phase t2, a third input phase t3, a first reset phase t4, a second reset phase t5 and a third reset phase t6 that are set in sequence;

In the first preparation phase t01, K1 provides a low voltage signal, K2 provides a high voltage signal, I1 and I2 provide a low voltage signal, R1 provides a low voltage signal, as shown in FIG. 12A, M11 is turned on, M6 is turned on, M13 is turned off, and the potential of PD1 is a low voltage, M7 is turned on, the potential of PD2 is a low voltage, M8 is turned on, the potential of PU1 is a high voltage, M9 is turned off, M6 is turned on, the potential of PU is a high voltage, M01 is turned on, M02 is turned off, E1 output is a low voltage signal; M1 is turned off, M2 is turned on, M3 is turned off, M4 is turned on, M5 is turned off, the potential of the PPU is maintained at a high voltage, and G1 outputs a high voltage signal;

In the second preparation phase t02, K1 provides a high voltage signal, K2 provides a low voltage signal, I1 and I2 provide a low voltage signal, R1 provides a low voltage signal, as shown in FIG. 12B, M11 is turned off, M6 is turned off, since the potential of the second clock signal provided by K2 is reduced, so the potential of PD1 is further reduced due to coupling, M7 is turned on, the potential of PD2 is a high voltage, M12 is turned off, M8 is turned off, the potential of PU1 is a high voltage, M9 is turned on, M10 is turned on, the potential of PU is a high voltage, M01 is turned on, M02 is turned off, E1 outputs a low voltage signal; M1 is turned off, M2 is turned on, M3 is turned off, M4 is turned on, M5 is turned off, the potential of PPU is a high voltage, G1 outputs a high voltage signal;

In the first input phase t1, K1 provides a low voltage signal, K2 provides a high voltage signal, I1 and I2 provide a high voltage signal, R1 provides a low voltage signal, as shown in FIG. 12C, M11 is turned on, M6 is turned on, M13 is turned off, and the potential of PD1 is a high voltage, M7 is turned off, the potential of PD2 is a low voltage, M8 is turned on, the potential of PU1 is a high voltage, M9 is turned off, M10 is turned off, the potential of PU is maintained at high voltage, M01 and M02 are both turned off, E1 keeps outputting a low voltage signal; M1 is turned off, M2 is turned off, M3 is turned off, M4 is turned off, and M5 is turned off, the potential of PPU is maintained at a high voltage, and G1 continues to output a high voltage signal;

In the second input phase t2, K1 provides a high voltage signal, K2 provides a low voltage signal, I1 and I2 provide a high voltage signal, R1 provides a low voltage signal, as shown in FIG. 12D, M11 and M6 are turned off, and the potential of PD2 is maintained at a low voltage, M13 and M12 are turned on, the potential of PD1 is a high voltage, M8 is turned on, the potential of PU1 is a low voltage, M9 is turned on, the potential of PU is a low voltage, M01 is turned off, M02 is turned on, E1 outputs a high voltage signal; M1 is turned on, M2 is turned off, M3 is turned on, M4 is turned off, M5 is turned on, the potential of the PPU is a low voltage, and G1 outputs a high voltage signal;

In the third input phase t3, K1 provides a low voltage signal, K2 provides a high voltage signal, I1 and I2 provide a high voltage signal, R1 provides a high voltage signal, as shown in FIG. 12E, M11 and M6 are turned on, and the potential of PD1 is a high voltage, M7 is turned off, the potential of PD2 is a low voltage, M13 is turned off, M8 is turned on, the potential of PU1 is a high voltage signal, M9 is turned off, M10 is turned off, the potential of PU is maintained at a low voltage, M01 is turned off, M02 is turned on, E1 outputs a high voltage signal; M1 is turned off, M2 is turned off, M3 is turned on, M4 is turned off, M5 is turned off, G1 outputs a low voltage signal, and the potential of the PPU is reduced to a lower voltage due to coupling;

In the first reset phase t4, K1 provides a high voltage signal, K2 provides a low voltage signal, I1 and I2 provide a low voltage signal, R1 provides a high voltage signal, as shown in FIG. 12F, M11 and M6 are turned off, and the potential of PD2 is maintained at a low voltage, M12 and M13 are both turned on, the potential of PD1 is a high voltage, M8 is turned on, the potential of PU1 is a low voltage, M10 is turned off, the potential of PU is a low voltage, M01 is turned off, M02 is turned on, E1 outputs a high voltage signal; M1 is turned on, M2 is turned on, M3 is turned off, M4 is turned on, M5 is turned on, the potential of PPU is a high voltage, and G1 outputs a high voltage signal;

In the second reset phase t5, K1 provides a low voltage signal, K2 provides a high voltage signal, I1 and I2 provide a low voltage signal, R1 provides a high voltage signal, as shown in FIG. 12G, M11 and M6 are turned on, M11 is turned off, and the potential of PD1 is a low voltage, M10 is turned on, M9 is turned off, the potential of PU is a high voltage, M7 is turned on, the potential of PD2 is a low voltage, M8 is turned on, the potential of PU1 is a high voltage, M01 is turned on, M02 is turned off, E1 outputs a low voltage signal; M1 is turned off, M2 is turned on, M3 is turned off, M4 is turned on, M5 is turned off, the potential of PPU is a high voltage, and G1 outputs a high voltage signal;

In the third reset phase t6, K1 provides a high voltage signal, K2 provides a low voltage signal, I1 and I2 provide a low voltage signal, and R1 provides a low voltage signal, as shown in FIG. 12H, M11 and M6 are turned off, the potential of the second clock signal provided by K2 is reduced from a high voltage to a low voltage, then the potential of PD1 is further reduced due to coupling, M7 is turned on, the potential of PD2 is a high voltage, M12 is turned off, M8 is turned off, the potential of PU1 is maintained at a high voltage, M9 is turned on, M10 is turned on, the potential of PU is a high voltage, M01 is turned on, M02 is turned off, E1 outputs a low voltage signal; M1 is turned off, M2 is turned on, M3 is turned off, M4 is turned on, M5 is turned off, the potential of PPU is a high voltage, G1 outputs a high voltage signal.

During operation, the driving circuit described in at least one embodiment of the present disclosure can output a light-emitting control signal and a gate driving signal at the same time, and the pulse width of the light-emitting control signal is adjustable.

Figure 13:
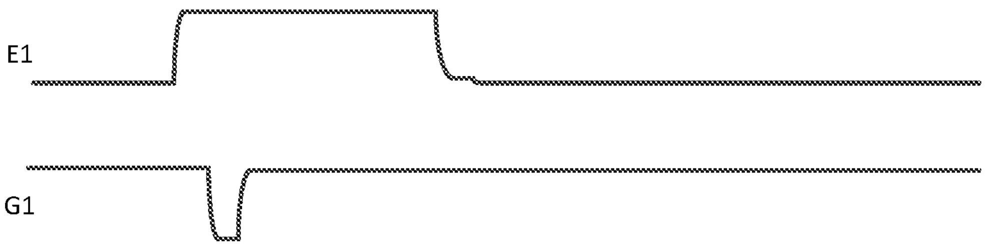
FIG. 13 is a waveform diagram of a light-emitting control signal and a gate driving signal provided by the driving circuit according to at least one embodiment of the present disclosure.

As shown in FIG. 13, the time during which the potential of the light-emitting control signal outputted by the driving circuit according to at least one embodiment of the present disclosure continues to be a high voltage (i.e., the pulse width of the light-emitting control signal) is 7H.

Figure 14:
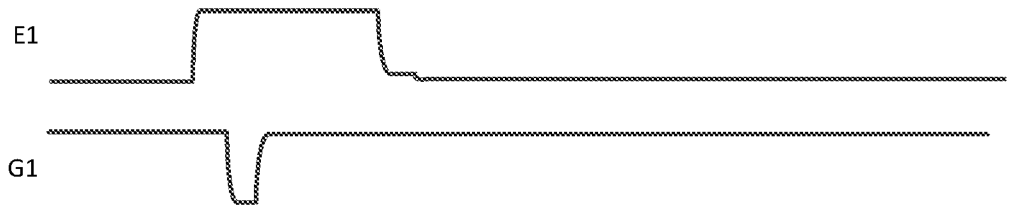
FIG. 14 is a waveform diagram of a light-emitting control signal and a gate driving signal provided by the driving circuit according to at least one embodiment of the present disclosure.

As shown in FIG. 14, the time during which the potential of the light-emitting control signal outputted by the driving circuit according to at least one embodiment of the present disclosure continues to be a high voltage (i.e., the pulse width of the light-emitting control signal) is 5H.

Figure 15:
FIG. 15 is a waveform diagram of a light-emitting control signal and a gate driving signal provided by the driving circuit according to at least one embodiment of the present disclosure.

As shown in FIG. 15, the time during which the potential of the light-emitting control signal outputted by the driving circuit according to at least one embodiment of the present disclosure continues to be a high voltage (i.e., the pulse width of the light-emitting control signal) is 3H.

Figure 16:
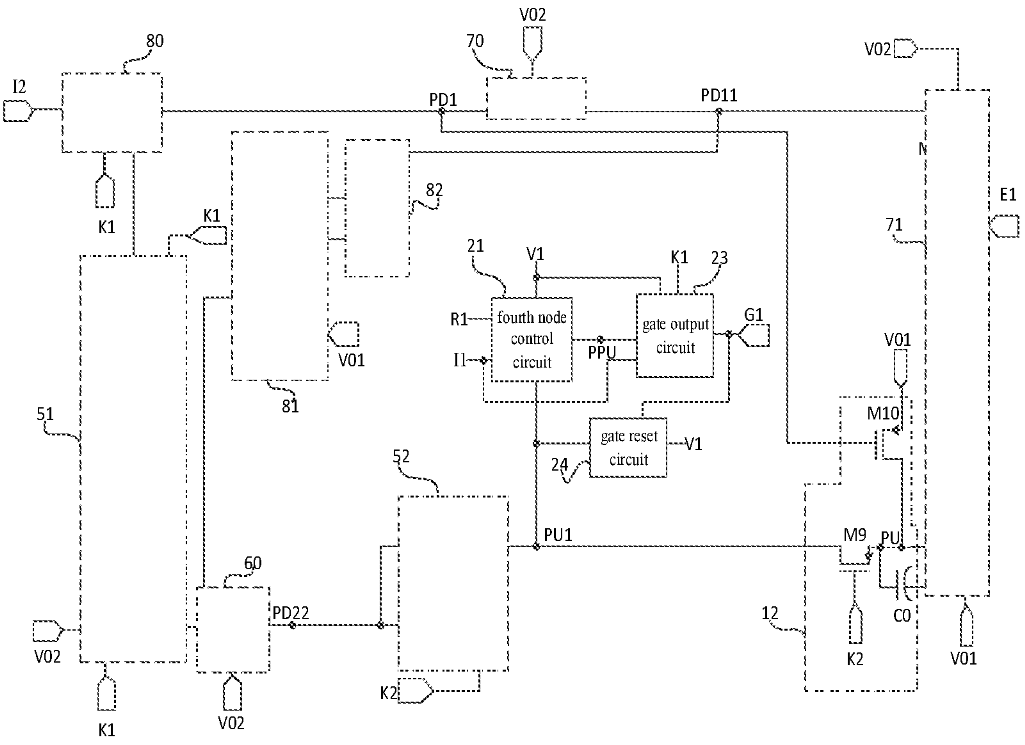
FIG. 16 is a circuit diagram of a driving circuit according to at least one embodiment of the present disclosure.

As shown in FIG. 16, on the basis of at least one embodiment of the driving circuit shown in FIG. 9, The fifth node control sub-circuit 51 includes a sixth transistor M6 and a seventh transistor M7;

The gate electrode of the sixth transistor M6 is electrically connected to the first clock signal terminal K1, the first electrode of the sixth transistor M6 is electrically connected to the low voltage terminal V02, and the second electrode of the sixth transistor M6 is electrically connected to the fifth node PD2;

The gate electrode of the seventh transistor M7 is electrically connected to the third node PD1, the first electrode of the seventh transistor M7 is electrically connected to the first clock signal terminal K1, and the second electrode of the seventh transistor M7 is electrically connected to the fifth Node PD2;

The first node control sub-circuit 52 includes an eighth transistor M8 and a second capacitor C2, and the conduction control circuit 60 includes a first conduction control transistor M21;

The gate electrode of the first conduction control transistor M21 is electrically connected to the low voltage terminal V02, the first electrode of the first conduction control transistor M21 is electrically connected to the fifth node PD2, and the second electrode of the first conduction control transistor M21 is electrically connected to the sixth node PD22;

The gate electrode of the eighth transistor M8 is electrically connected to the sixth node PD22, the first electrode of the eighth transistor M8 is electrically connected to the second clock signal terminal K2, and the second electrode of the eighth transistor M8 is electrically connected to the first node PU1;

The first terminal of the second capacitor C2 is electrically connected to the sixth node PD22, and the second terminal of the second capacitor C2 is electrically connected to the first node PU1;

The second node control circuit 12 includes a ninth transistor M9, a tenth transistor M10 and a control capacitor C0;

The gate electrode of the ninth transistor M9 is electrically connected to the second clock signal terminal K2, the first electrode of the ninth transistor M9 is electrically connected to the first node PU1, and the second electrode of the ninth transistor M9 is electrically connected to the second node PU;

The gate electrode of the tenth transistor M10 is electrically connected to the third node PD1, the first electrode of the tenth transistor M10 is electrically connected to the high voltage terminal V01, and the second electrode of the tenth transistor M10 is electrically connected to the second node PU;

The first terminal of the control capacitor C0 is electrically connected to the second node PU, and the second terminal of the control capacitor C0 is electrically connected to the high voltage terminal V01;

The conduction sub-circuit 70 includes a second conduction control transistor M22, the third node control sub-circuit 80 includes an eleventh transistor M11, and the seventh node control sub-circuit 81 includes a twelfth transistor M12 and a thirteenth transistor M13; the eighth node control sub-circuit 82 includes a third capacitor C3;

The gate electrode of the second conduction control transistor M22 is electrically connected to the low voltage terminal V02, the first electrode of the second conduction control transistor M22 is electrically connected to the third node PD1, and the second electrode of the second conduction control transistor M22 is electrically connected to the eighth node PD11;

The gate electrode of the eleventh transistor M11 is electrically connected to the first clock signal terminal K1, the first electrode of the eleventh transistor M11 is electrically connected to the second input terminal I2, and the second electrode of the eleventh transistor M11 is electrically connected to the third node PD1;

The gate electrode of the twelfth transistor M12 is electrically connected to the fifth node PD2, the first electrode of the twelfth transistor M12 is electrically connected to the high voltage terminal V01, and the second electrode of the twelfth transistor M12 is electrically connected to the seventh node N1;

The gate electrode of the thirteenth transistor M13 is electrically connected to the eighth node PD11, the first electrode of the thirteenth transistor M13 is electrically connected to the second clock signal terminal K2, and the second electrode of the thirteenth transistor M13 is electrically connected to the seventh node N1;

The first terminal of the third capacitor C3 is electrically connected to the seventh node N1, and the second terminal of the third capacitor C3 is electrically connected to the eighth node PD11;

The light-emitting control output sub-circuit 71 includes a first output transistor M01 and a second output transistor M02;

The gate electrode of the first output transistor M01 is electrically connected to the eighth node PD11, the first electrode of the first output transistor M01 is electrically connected to the low voltage terminal V02, and the second electrode of the first output transistor M01 is electrically connected to the light-emitting control signal output terminal E1;

The gate electrode of the second output transistor M02 is electrically connected to the second node PU, the first electrode of the second output transistor M02 is electrically connected to the light-emitting control signal output terminal E1, and the second electrode of the second output transistor M02 is electrically connected to the high voltage terminal V02.

In at least one embodiment of the driving circuit shown in FIG. 16, both I1 and I2 are electrically connected to the output terminal of the light-emitting control signal of the adjacent previous stage of driving circuit, and R1 is electrically connected to the light-emitting control signal output terminal of the adjacent next stage of driving circuit.

In at least one embodiment of the driving circuit shown in FIG. 16, all transistors are p-type transistors, but not limited thereto.

In at least one embodiment of the driving circuit shown in FIGS. 16, M21 and M22 may not be provided.

In at least one embodiment of the driving circuit shown in FIG. 16, the benefits of adding M21 are as follows: the potential of PD22 is stabilized, the influence of current leakage of M7 is reduced, and the control of M8 is stabilized;

The benefits of adding M22 are as follows: the low potential of PD11 is stabilized and the influence of the current leakage of M11 on the potential of PD11 is reduced.

Figure 17:
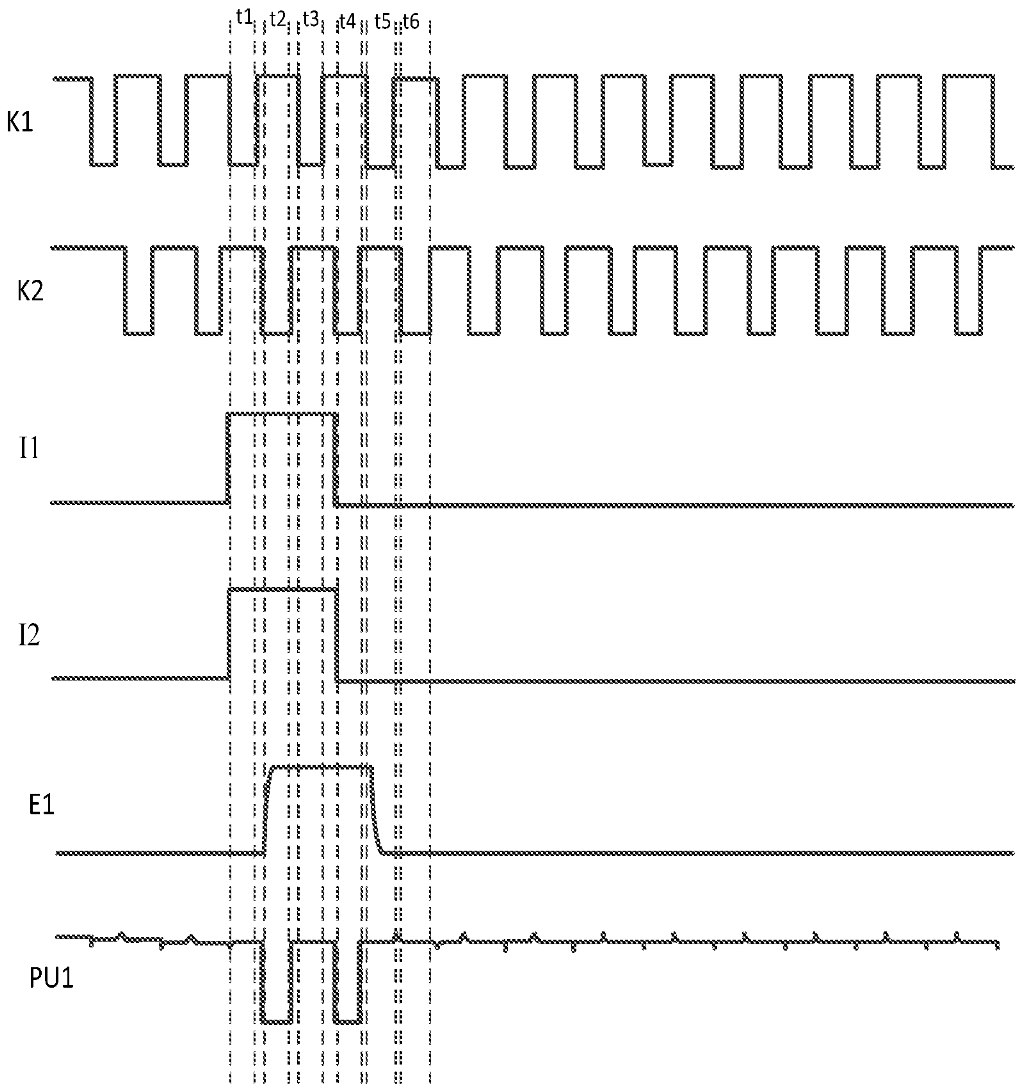
FIG. 17 is a working timing diagram of the driving circuit shown in FIG. 16 according to at least one embodiment of the present disclosure.

As shown in FIG. 17, during operation of the driving circuit shown in FIG. 16 of the present disclosure, the driving cycle includes a first input phase t1, a second input phase t2, a third input phase t3, a first reset phase t4, a second reset phase t4 and a third reset phase t5;

In the first input phase t1, K1 provides a low voltage signal, K2 provides a high voltage signal, I1 and I2 provide a high voltage signal, M11 and M6 are turned on, the potential of PD1 is a high voltage, M22 is turned on, the potential of PD11 is a high voltage, the potential of PD2 is a low voltage, M21 is turned on, the potential of PD22 is a low voltage, M8 is turned on, the potential of PU1 is a high voltage, M9 is turned off, the potential of PU is maintained at a high voltage, M10 is turned off, M13 is turned off, M12 is turned on, the potential of N1 is a high voltage, M01 and M02 are both turned off, and E1 continues to output a low voltage signal;

In the second input phase t2, K1 provides a high voltage signal, K2 provides a low voltage signal, I1 and I2 provide a high voltage signal, M11 and M6 are turned off, M7 is turned off, the potential of PD2 is maintained at a low voltage, M12 is turned on, and the potential of N1 is a high voltage, the potential of PD11 is a high voltage, the potential of PD1 is a high voltage, M21 and M22 are turned on, the potential of PD22 is coupled to a lower voltage, M8 is turned on, the potential of PU1 is a low voltage, M9 is turned on, the potential of PU is a low voltage, M01 is turned off, M02 is turned on, and E1 outputs a high voltage signal;

In the third input phase t3, K1 provides a low voltage signal, K2 provides a high voltage signal, I1 and I2 provide a high voltage signal, M11 and M6 are turned on, M22 is turned on, the potential of PD1 and PD11 are both a high voltage, and the potential of PD2 is a low voltage, M21 is turned on, the potential of PD22 is a low voltage, M12 is turned on, M13 is turned off, the potential of N1 is a high voltage, M8 is turned on, the potential of PU1 is a high voltage, M9 is turned off, M10 is turned off, and the potential of PU is maintained at a low voltage, M01 is turned off, M02 is turned on, and E1 outputs a high voltage signal;

In the first reset phase t4, K1 provides a high voltage signal, K2 provides a low voltage signal, I1 and I2 provide a low voltage signal, M11 and M6 are turned off, the potential of PD1 is a high voltage, M7 is turned off, and the potential of PD2 remains at a low voltage, M21 is turned on, the potential of PD22 is further pulled down, M8 is turned on, the potential of PU1 is a low voltage, M9 is turned on, the potential of PU is a low voltage, M12 is turned on, M13 is turned off, the potential of N1 is a high voltage, the potential of PD11 is a high voltage, M01 is turned off, M02 is turned on, and E1 outputs a high voltage signal;

In the second reset phase t5, K1 provides a low voltage signal, K2 provides a high voltage signal, I1 and I2 provide a low voltage signal, M11 and M6 are turned on, the potential of PD1 is a low voltage, M7 is turned on, the potential of PD2 is a low voltage, M12 is turned on, M22 is turned on, the potential of PD11 is a low voltage, M13 is turned on, the potential of N1 is a high voltage, M21 is turned on, the potential of PD22 is a low voltage, M8 is turned on, the potential of PU1 is a high voltage, M9 is turned off, M10 is turned on, the potential of PU is a high voltage, M01 is turned on, M02 is turned off, and E1 outputs a low voltage signal;

In the third reset phase t6, K1 provides a high voltage signal, K2 provides a low voltage signal, I1 and I2 provide a low voltage signal, M11 and M6 are turned off, the potential of PD1 is a low voltage, M7 is turned on, and the potential of PD2 is a high voltage, M12 is turned off, M22 is turned on, the potential of PD11 is a low voltage, M13 is turned on, the potential of N1 is a low voltage, the potential of PD11 is further pulled down, M10 is turned on, the potential of PU is a high voltage, M01 is turned on, M02 is turned off, E1 provides a low voltage signal.

Figure 18:
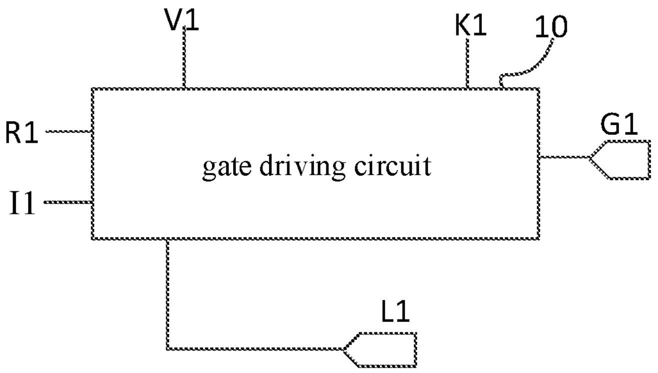
FIG. 18 is a structural diagram of a gate driving circuit according to at least one embodiment of the present disclosure.

In at least one embodiment of the present disclosure, as shown in FIG. 18, a gate driving circuit 10 is provided. The gate driving circuit 10 is electrically connected to a control node L1, a first input terminal I1, a reset terminal R1, and a first clock signal terminal K1, a first voltage terminal V1 and a gate driving signal output terminal G1, and is configured to control the gate driving signal output terminal G1 to output the gate driving signal according to the first clock signal provided by the first clock signal terminal K1 and the first voltage signal provided by the first voltage terminal V1 under the control of the potential of the control node L1, the first input signal provided by the first input terminal I1 and the reset signal provided by the reset terminal R1.

In the gate driving circuit provided by at least one embodiment of the present disclosure, a signal obtained by OR operation between the reset signal provided by the reset terminal R1 and the voltage signal of the first node PU1 in the current row is used as the input/reset function, that is, when the reset signal and the voltage signal of the first node PU1 in the current row is a valid voltage signal at the same time, the input function is realized, and when the voltage signal of the first node PU1 in the current row is a valid voltage signal and the reset signal is an invalid voltage signal, the reset function is realized. When the first input signal provided by I1 is a valid voltage signal, denoising is performed for G1, so that the gate driving circuit 10 provided by at least one embodiment of the present disclosure can generate a gate driving signal.

Optionally, the control node L1 may be the first node in the light-emitting control signal generating circuit; the structure of the light-emitting control signal generating circuit may not be limited to the circuit structure provided by the embodiments of the present disclosure.

Figure 19:
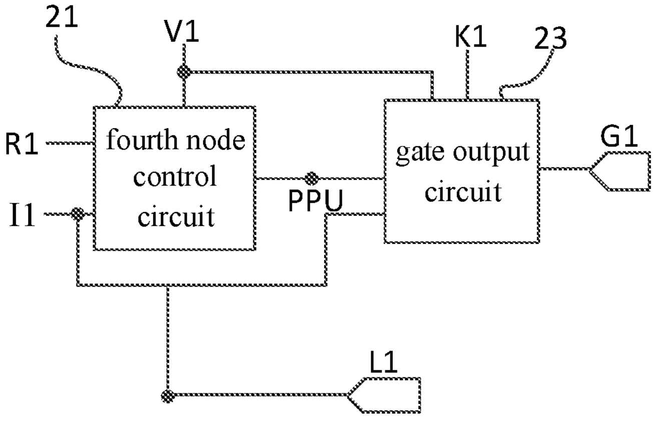
FIG. 19 is a structural diagram of the gate driving circuit according to at least one embodiment of the present disclosure.

As shown in FIG. 19, based on at least one embodiment of the gate driving circuit shown in FIG. 18, the at least one embodiment of the gate driving circuit may include a fourth node control circuit 21 and a gate output circuit 23;

The fourth node control circuit 21 is electrically connected to the control node L1, the fourth node PPU, the reset terminal R1, the first input terminal I1 and the first voltage terminal V1, and is configured to control to connect or disconnect the fourth node PPU and the reset terminal R1 under the control of the potential of the control node L1, and control to connect or disconnect the fourth node PPU and the first voltage terminal V1 under the control of the first input signal provided by the first input terminal I1;

The gate output circuit 23 is electrically connected to the fourth node PPU, the gate driving signal output terminal G1, the first clock signal terminal K1, the first input terminal I1 and the first voltage terminal V1, and is configured to control to connect or disconnect the gate driving signal output terminal G1 and the first clock signal terminal K1 under the control of the potential of the fourth node PPU, and control to connect or disconnect the gate driving signal output terminal G1 and the first voltage terminal V1 under the control of the first input signal provided by the first input terminal I1, and control the gate driving signal provided by the gate driving signal output terminal G1 according to the potential of the fourth node PPU.

When at least one embodiment of the gate driving circuit shown in FIG. 19 is in operation, the driving cycle may include a first input phase, a second input phase, a third input phase and a first reset phase which are arranged in sequence;

In the first input phase, under the control of the potential of the control node L1, the fourth node control circuit 21 controls the fourth node PPU to be disconnected from the reset terminal R1, and under the control of the first input signal, controls the fourth node PPU to be disconnected from the first voltage terminal V1; under the control of the potential of the fourth node PPU, the gate output circuit 23 controls the gate driving signal output terminal G1 to be disconnected from the first clock signal terminal K1, and under the control of the first input signal, controls the gate driving signal output terminal G1 to be disconnected from the first voltage terminal V1, so that the gate driving signal output terminal G1 maintains outputting the first voltage signal;

In the second input phase, under the control of the potential of the control node L1, the fourth node control circuit 21 controls to connect the fourth node PPU and the reset terminal R1; under the control of the potential of the fourth node PPU, the gate output circuit 23 controls to connect the gate driving signal output terminal G1 and the first clock signal terminal K1, so that the gate driving signal output terminal G1 outputs the first voltage signal;

In the third input phase, under the control of the potential of the control node L1, the fourth node control circuit 21 controls to disconnect the fourth node PPU from the reset terminal R1; the gate output circuit 23 control to connect the gate driving signal output terminal G1 and the first clock signal terminal K1 under the control of the potential of the fourth node PPU, so that the gate driving signal output terminal G1 outputs the second voltage signal;

In the first reset phase, the fourth node control circuit 21 controls to connect the fourth node PPU and the reset terminal R1 under the control of the potential of the control node L1, and controls to connect the fourth node PPU and the first voltage terminal V1 under the control of the first input signal; the gate output circuit 23 controls the gate driving signal output terminal G1 to be disconnected from the first clock signal terminal K1 under the control of the potential of the fourth node PPU, and controls to connect the gate driving signal output terminal G1 and the first voltage terminal V1 under the control of the first input signal, so that the gate driving signal output terminal G1 outputs a first voltage signal.

Figure 20:
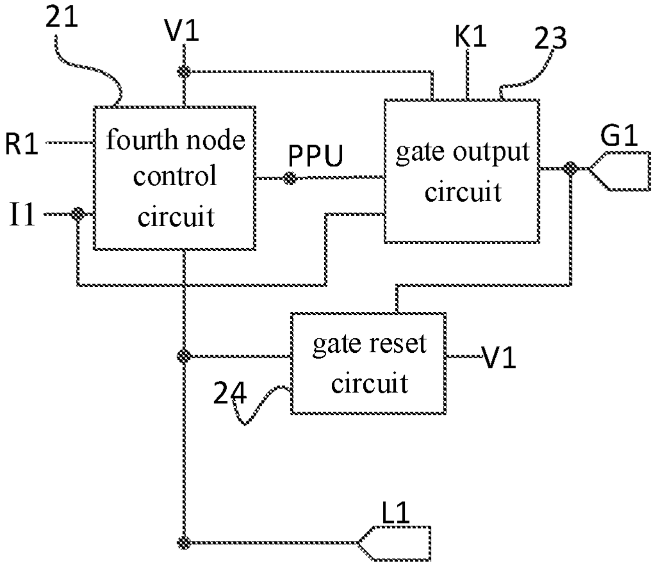
FIG. 20 is a structural diagram of the gate driving circuit according to at least one embodiment of the present disclosure.

As shown in FIG. 20, on the basis of at least one embodiment of the gate driving circuit shown in FIG. 19, the driving circuit according to at least one embodiment of the present disclosure may further include a gate reset circuit 24;

The gate reset circuit 24 is electrically connected to the control node L1, the gate driving signal output terminal G1 and the first voltage terminal V1, and is used to control to connect or disconnect the gate driving signal output terminal G1 and the first voltage terminal V1 under the control of the potential of the control node L1.

In the specific implementation, in order to prevent the potential of the first input signal provided by I1 from continuing to be an invalid voltage for too long and unable to reset G1 in time, the gate reset circuit 24 is added to control the gate driving signal output terminal to output the first voltage signal under the control of the potential of the control node L11, to reset G1.

When at least one embodiment of the driving circuit shown in FIG. 20 of the present disclosure is in operation, In the first input phase, the gate reset circuit 24 controls the gate driving signal output terminal G1 to be disconnected from the first voltage terminal V1 under the control of the potential of the control node L1;

In the second input phase, the gate reset circuit 24 controls to connect the gate driving signal output terminal G1 and the first voltage terminal V1 under the control of the potential of the control node L1;

In the third input phase, the gate reset circuit 24 controls the gate driving signal output terminal G1 to be disconnected from the first voltage terminal V1 under the control of the potential of the control node L1;

In the first reset phase, under the control of the potential of the control node L1, the gate reset circuit 24 controls to connect the gate driving signal output terminal G1 and the first voltage terminal V1 to reset G1.

Figure 21:
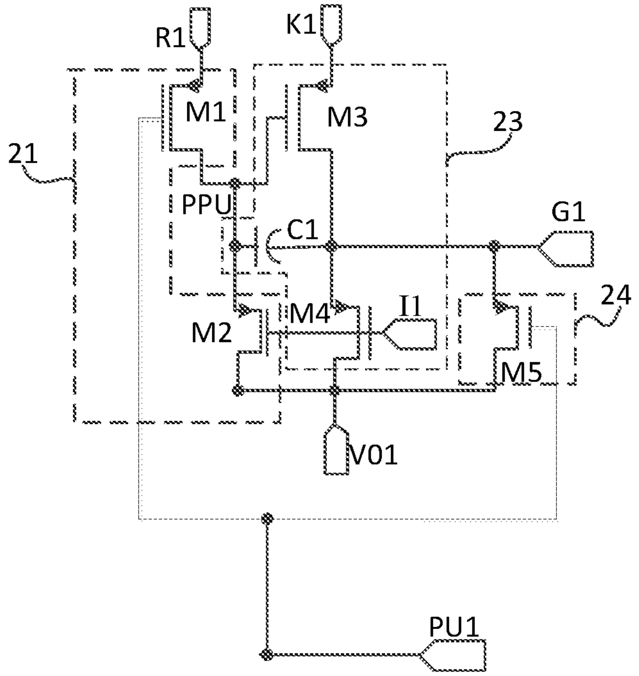
FIG. 21 is a circuit diagram of the gate driving circuit according to at least one embodiment of the present disclosure.

As shown in FIG. 21, based on at least one embodiment of the gate driving circuit shown in FIG. 20, the fourth node control circuit 21 includes a first transistor M1 and a second transistor M2;

The gate electrode of the first transistor M1 is electrically connected to the control node L1, the first electrode of the first transistor M1 is electrically connected to the reset terminal R1, and the second electrode of the first transistor M1 is electrically connected to the fourth node PPU;

The gate electrode of the second transistor M2 is electrically connected to the first input terminal I1, the first electrode of the second transistor M2 is electrically connected to the fourth node PPU, and the second electrode of the second transistor M2 is electrically connected to the high voltage terminal V01;

The gate output circuit 23 includes a third transistor M3, a fourth transistor M4 and a first capacitor C1;

The gate electrode of the third transistor M3 is electrically connected to the fourth node PPU, the first electrode of the third transistor M3 is electrically connected to the first clock signal terminal K1, and the second electrode of the third transistor M3 is electrically connected to the gate driving signal output terminal G1;

The gate electrode of the fourth transistor M4 is electrically connected to the first input terminal I1, the first electrode of the fourth transistor M4 is electrically connected to the gate driving signal output terminal G1, and the second electrode of the fourth transistor M4 is electrically connected to the high voltage terminal V01;

The first terminal of the first capacitor C1 is electrically connected to the fourth node PPU, and the second terminal of the first capacitor C1 is electrically connected to the gate driving signal output terminal G1.

In at least one embodiment of the gate driving circuit shown in FIG. 21, each transistor is a p-type transistor.

In at least one embodiment of the gate driving circuit shown in FIG. 21, the control node L1 may be the first node in the light-emitting control signal generating circuit.

Figure 22:
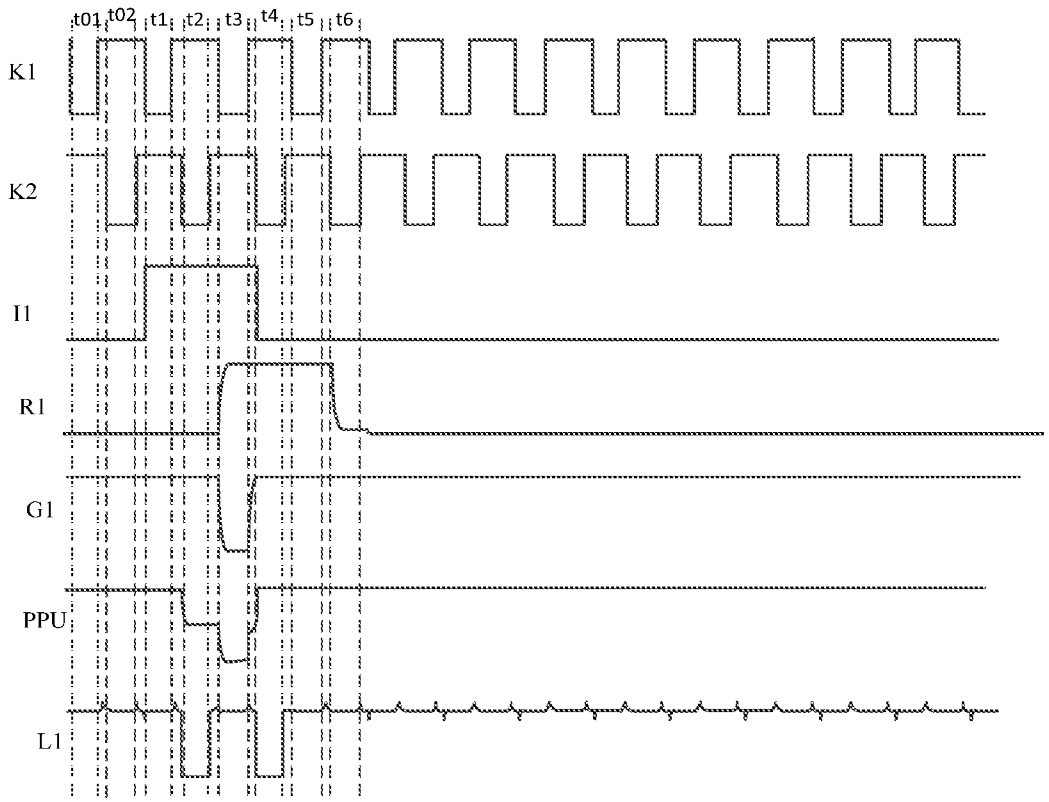
FIG. 22 is a working timing diagram of the gate driving circuit according to at least one embodiment of the present disclosure.

As shown in FIG. 22, when at least one embodiment of the gate driving circuit shown in FIG. 21 is in operation, the driving cycle includes a first preparation phase t01, a second preparation phase t02, a first input phase t1, a second input phase t2, a third input phase t3, a first reset phase t4, a second reset phase t5 and a third reset phase t6;

In the first preparation phase t01, K1 provides a low voltage signal, I1 provides a low voltage signal, R1 provides a low voltage signal, the potential of L1 is a high voltage, the potential of PPU is a high voltage, M1 is turned off, M2 is turned on, M3 is turned off, M4 is turned on, M5 is turned off, and G1 outputs a high voltage signal;

In the second preparation phase t01, K1 provides a high voltage signal, I1 provides a low voltage signal, R1 provides a low voltage signal, the potential of L1 is a high voltage, the potential of PPU is a high voltage, M1 is turned off, M2 is turned on, M3 is turned off, M4 is turned on, M5 is turned off, and G1 outputs a high voltage signal;

In the first input phase t1, K1 provides a low voltage signal, I1 provides a high voltage signal, R1 provides a low voltage signal, the potential of L1 is a high voltage, the potential of PPU is a high voltage, M1, M2, M3, M4 and M5 are all turned off, G1 continues to output a high voltage signal;

In the second input phase t2, K1 provides a high voltage signal, I1 provides a high voltage signal, R1 provides a low voltage signal, the potential of L1 is a low voltage, the potential of the PPU is pulled down, M1 is turned on, M2 is turned off, M3 is turned on, and M4 is turned off, M5 is turned on, G1 provides a high voltage signal;

In the third input phase t3, K1 provides a low voltage signal, I1 provides a high voltage signal, R1 provides a high voltage signal, the potential of L1 is a high voltage, the potential of the PPU is further pulled down, M1 and M2 are turned off, M3 is turned on, and M4 is turned off, M5 is turned off, G1 provides a low voltage signal;

In the first reset phase t4, K1 provides a high voltage signal, I1 provides a low voltage signal, R1 provides a high voltage signal, the potential of L1 is a low voltage, the potential of PPU is a high voltage, M1 and M2 are turned on, M3 is turned off, and M4 is turned on, M5 is turned on, G1 provides a high voltage signal to reset G1;

In the second reset phase t5, K1 provides a low voltage signal, I1 provides a low voltage signal, R1 provides a high voltage signal, the potential of L1 is a high voltage, the potential of PPU is a high voltage, M1 is turned off, M2 is turned on, M3 is turned off, M4 is turned on, M5 is turned off, and G1 provides a high voltage signal;

In the third reset phase t6, K1 provides a high voltage signal, I1 provides a low voltage signal, R1 provides a low voltage signal, the potential of L1 is a high voltage, the potential of PPU is a high voltage, M1 is turned off, M2 is turned on, M3 is turned off, M4 is turned on, M5 is turned off, and G1 provides a high voltage signal. The driving method described in the embodiment of the present disclosure is applied to the above-mentioned driving circuit, and the driving method includes:

Controlling, by the gate driving circuit, the gate driving signal output terminal to output the gate driving signal according the first clock signal provided by the first clock signal terminal and the first voltage signal provided by the first voltage terminal under the control of the potential of the first node, the first input signal provided by the first input terminal, and the reset signal provided by the reset terminal.

By using the driving method described in the embodiments of the present disclosure, the driving circuit can generate the gate driving signal while generating the light-emitting control signal, which can simplify the driving scheme, reduce the number of signals, and narrow the frame.

The driving method described in at least one embodiment of the present disclosure is applied to the above-mentioned driving circuit, and the driving cycle includes a first input phase, a second input phase, a third input phase and a first reset phase that are set in sequence; the driving method includes:

In the first input phase, under the control of the potential of the first node, the fourth node control circuit controlling to disconnect the fourth node from the reset terminal, and under the control of the first input signal, controlling to disconnect the fourth node from the first voltage terminal; under the control of the potential of the fourth node, the gate output circuit controlling to disconnect the gate driving signal output terminal from the first clock signal terminal, and under the control of the first input signal, controlling to disconnect the gate driving signal output terminal from the first voltage terminal, so that the gate driving signal output terminal maintaining outputting the first voltage signal;

In the second input phase, the fourth node control circuit controlling to connect the fourth node and the reset terminal under the control of the potential of the first node; the gate output circuit controlling to connect the gate driving signal output terminal and the first clock signal terminal under the control of the potential of the fourth node, so that the gate driving signal output terminal outputs the first voltage signal;

In the third input phase, the fourth node control circuit controlling to disconnect the fourth node from the reset terminal under the control of the potential of the first node; the gate output circuit controlling to connect the gate driving signal output terminal and the first clock signal terminal under the control of the potential of the fourth node, so that the gate driving signal output terminal outputs the second voltage signal;

In the first reset phase, the fourth node control circuit controlling to connect the fourth node and the reset terminal under the control of the potential of the first node, and controlling to connect the fourth node and the first voltage terminal under the control of the first input signal; under the control of the potential of the fourth node, the gate output circuit controlling to disconnect the gate driving signal output terminal from the first clock signal terminal, and under the control of the first input signal, controlling to connect the gate driving signal output terminal and the first voltage terminal, so that the gate driving signal output terminal outputs the first voltage signal.

In at least one embodiment of the present disclosure, the driving circuit further includes a gate reset circuit; the driving method further includes:

In the first input phase, the gate reset circuit controlling to disconnect the gate driving signal output terminal from the first voltage terminal under the control of the potential of the first node;

In the second input phase, the gate reset circuit controlling to connect the driving signal output terminal and the first voltage terminal under the control of the potential of the first node;

In the third input phase, the gate reset circuit controlling to disconnect the gate driving signal output terminal from the first voltage terminal under the control of the potential of the first node;

In the first reset phase, the gate reset circuit controlling to connect the gate driving signal output terminal and the first voltage terminal under the control of the potential of the first node.

In the specific implementation, in order to prevent the potential of the first input signal provided by the first input terminal from continuing to be an invalid voltage for too long and unable to reset the gate driving signal output terminal in time, the gate reset circuit is added to control the gate driving signal output terminal to output a first voltage signal under the control of the potential of the first node, to reset the gate driving signal output terminal.

The driving module according to the embodiment of the present disclosure includes a plurality of stages of above-mentioned driving circuits.

In a specific implementation, a second input terminal of the driving circuit may be electrically connected to a light-emitting control signal output terminal of an adjacent previous stage of driving circuit.

Optionally, the first input terminal of the driving circuit is electrically connected to a light-emitting control signal output terminal of the adjacent previous stage of driving circuit; or, the first input terminal of the driving circuit is electrically connected to the light-emitting control signal output terminal of the driving circuit.

Optionally, the reset terminal of the driving circuit is electrically connected to the light-emitting control signal output terminal of an adjacent next stage of driving circuit; or, the reset terminal is electrically connected to a gate driving signal output terminal of an adjacent previous stage of driving circuit.

The display device according to the embodiment of the present disclosure includes the above-mentioned driving module.

The display device provided by at least one embodiment of the present disclosure may be any product or component with a display function, such as a mobile phone, a tablet computer, a TV, a monitor, a notebook computer, a digital photo frame, and a navigator.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A driving circuit, comprising a light-emitting control signal generating circuit and a gate driving circuit; wherein the light-emitting control signal generating circuit includes a first node control circuit, a second node control circuit, a third node control circuit and a light-emitting control output circuit;

the first node control circuit is configured to control a potential of a first node;

the second node control circuit is configured to control a potential of a second node;

the third node control circuit is configured to control a potential of a third node;

the light-emitting control output circuit is configured to control a light-emitting control signal output terminal to output a light-emitting control signal according to the potential of the second node and the potential of the third node;

the gate driving circuit is configured to control a gate driving signal output terminal to output a gate driving signal according to a first clock signal provided by a first clock signal terminal and a first voltage signal provided by a first voltage terminal under the control of the potential of the first node, a first input signal provided by a first input terminal and a reset signal provided by a reset terminal;

wherein the gate driving circuit comprises a fourth node control circuit and a gate output circuit;

the fourth node control circuit is configured to control to connect or disconnect a fourth node and the reset terminal under the control of the potential of the first node, and control to connect or disconnect the fourth node and the first voltage terminal under the control of the first input signal provided by the first input terminal;

the gate output circuit is configured to control to connect or disconnect the gate driving signal output terminal and the first clock signal terminal under the control of potential of the fourth node, and control to connect or disconnect the gate driving signal output terminal and the first voltage terminal under the control of the first input signal, and to control the gate driving signal provided by the gate driving signal output terminal according to the potential of the fourth node.

2. The driving circuit according to claim 1, further comprising a gate reset circuit; wherein the gate reset circuit is configured to control to connect or disconnect the gate driving signal output terminal and the first voltage terminal under the control of the potential of the first node.

3. The driving circuit according to claim 2, wherein the gate reset circuit comprises a fifth transistor;

a control electrode of the fifth transistor is electrically connected to the first node, a first electrode of the fifth transistor is electrically connected to the gate driving signal output terminal, and a second electrode of the fifth transistor is electrically connected to the first voltage terminal.

4. The driving circuit according to claim 1, wherein the fourth node control circuit comprises a first transistor and a second transistor;

a control electrode of the first transistor is electrically connected to the first node, a first electrode of the first transistor is electrically connected to the reset terminal, and a second electrode of the first transistor is electrically connected to the fourth node connect;

a control electrode of the second transistor is electrically connected to the first input terminal, a first electrode of the second transistor is electrically connected to the fourth node, and a second electrode of the second transistor is electrically connected to the first voltage terminal.

5. The driving circuit according to claim 1, wherein the gate output circuit comprises a third transistor, a fourth transistor and a first capacitor;

a control electrode of the third transistor is electrically connected to the fourth node, a first electrode of the third transistor is electrically connected to the first clock signal terminal, and a second electrode of the third transistor is electrically connected to the gate driving signal output terminal;

a control electrode of the fourth transistor is electrically connected to the first input terminal, a first electrode of the fourth transistor is electrically connected to the gate driving signal output terminal, and a second electrode of the fourth transistor is electrically connected to the first voltage terminal;

a first terminal of the first capacitor is electrically connected to the fourth node, and a second terminal of the first capacitor is electrically connected to the gate driving signal output terminal.

6. The driving circuit according to claim 1, wherein the first node control circuit comprises a fifth node control sub-circuit and a first node control sub-circuit;

the fifth node control sub-circuit is configured to control to connect or disconnect a fifth node and a second voltage terminal under the control of the first clock signal provided by the first clock signal terminal, and control to connect or disconnect the fifth node and the first clock signal terminal under the control of the potential of the third node;

the first node control sub-circuit is configured to control the potential of the first node according to a potential of the fifth node and a second clock signal terminal.

7. The driving circuit according to claim 6, wherein the fifth node control sub-circuit comprises a sixth transistor and a seventh transistor;

a control electrode of the sixth transistor is electrically connected to the first clock signal terminal, a first electrode of the sixth transistor is electrically connected to the second voltage terminal, and a second electrode of the sixth transistor is electrically connected to the fifth node;

a control electrode of the seventh transistor is electrically connected to the third node, a first electrode of the seventh transistor is electrically connected to the first clock signal terminal, and a second electrode of the seventh transistor is electrically connected to the fifth node.

8. The driving circuit according to claim 6, wherein the first node control sub-circuit is configured to control to connect or disconnect the first node and the second clock signal terminal under the control of the potential of the fifth node, and control the potential of the first node according to the potential of the fifth node, wherein the first node control sub-circuit comprises an eighth transistor and a second capacitor;

a control electrode of the eighth transistor is electrically connected to the fifth node, a first electrode of the eighth transistor is electrically connected to the second clock signal terminal, and a second electrode of the eighth transistor is electrically connected to the first node;

a first terminal of the second capacitor is electrically connected to the fifth node, and a second terminal of the second capacitor is electrically connected to the first node.

9. The driving circuit according to claim 6, further comprising a conduction control circuit; wherein the conduction control circuit is configured to control to connect or disconnect the fifth node and a sixth node under the control of the second voltage signal provided by the second voltage terminal;

the first node control sub-circuit is configured to control to connect or disconnect the first node and the second clock signal terminal under the control of the potential of the sixth node, and is configured to control the potential of the first node according to the potential of the sixth node, wherein the first node control sub-circuit comprises an eighth transistor and a second capacitor, and the conduction control circuit comprises a first conduction control transistor;

a control electrode of the first conduction control transistor is electrically connected to the second voltage terminal, a first electrode of the first conduction control transistor is electrically connected to the fifth node, and a second electrode of the first conduction control transistor electrically connected to the sixth node;

a control electrode of the eighth transistor is electrically connected to a sixth node, a first electrode of the eighth transistor is electrically connected to the second clock signal terminal, and a second electrode of the eighth transistor is electrically connected to the first node;

a first terminal of the second capacitor is electrically connected to the sixth node, and a second terminal of the second capacitor is electrically connected to the first node.

10. The driving circuit according to claim 6, wherein the third node control circuit is configured to control to connect or disconnect the third node and the second input terminal under the control of the first clock signal provided by the first clock signal terminal, and control to connect or disconnect the third node and the first voltage terminal under the control of the potential of the fifth node and the second clock signal, and control the potential of the third node according to the second clock signal, wherein the third node control circuit comprises an eleventh transistor, a twelfth transistor, a thirteenth transistor and a third capacitor;

a control electrode of the eleventh transistor is electrically connected to the first clock signal terminal, a first electrode of the eleventh transistor is electrically connected to the second input terminal, and a second electrode of the eleventh transistor is electrically connected to the third node;

a control electrode of the twelfth transistor is electrically connected to the fifth node, and a first electrode of the twelfth transistor is electrically connected to the first voltage terminal;

a control electrode of the thirteenth transistor is electrically connected to the second clock signal terminal, a first electrode of the thirteenth transistor is electrically connected to a second electrode of the twelfth transistor, and a second electrode of the thirteenth transistor is electrically connected to the third node;

a first terminal of the third capacitor is electrically connected to the second clock signal terminal, and a second terminal of the third capacitor is electrically connected to the third node.

11. The driving circuit according to claim 6, wherein the third node control circuit comprises a seventh node control sub-circuit and a third node control sub-circuit;

the seventh node control sub-circuit is configured to control to connect or disconnect a seventh node and the first voltage terminal under the control of the potential of the fifth node, and to control to connect or disconnect the seventh node and the second clock signal terminal under the control of the potential of the third node;

the third node control sub-circuit is configured to control the potential of the third node according to a potential of the seventh node, and control to connect or disconnect the third node and the second input terminal under the control of the first clock signal provided by the first clock signal terminal, wherein the third node control sub-circuit comprises an eleventh transistor and a third capacitor; the seventh node control sub-circuit comprises a twelfth transistor and a thirteenth transistor;

a control electrode of the eleventh transistor is electrically connected to the first clock signal terminal, a first electrode of the eleventh transistor is electrically connected to the second input terminal, and a second electrode of the eleventh transistor is electrically connected to the third node;

a control electrode of the twelfth transistor is electrically connected to the fifth node, a first electrode of the twelfth transistor is electrically connected to the first voltage terminal, and a second electrode of the twelfth transistor is electrically connected to the seventh node;

a control electrode of the thirteenth transistor is electrically connected to the third node, a first electrode of the thirteenth transistor is electrically connected to the second clock signal terminal, and a second electrode of the thirteenth transistor is electrically connected to the seventh node;

a first terminal of the third capacitor is electrically connected to the seventh node, and a second terminal of the third capacitor is electrically connected to the third node.

12. The driving circuit according to claim 6, wherein the light-emitting control output circuit comprises a conduction sub-circuit; the third node control circuit comprises a third node control sub-circuit, a seventh node control sub-circuit and an eighth node control sub-circuit;

the conduction sub-circuit is used to control to connect or disconnect the third node and an eighth node under the control of the second voltage signal provided by the second voltage terminal;

the third node control sub-circuit is configured to control to connect or disconnect the second input terminal and the third node under the control of the first clock signal provided by the first clock signal terminal;

the seventh node control sub-circuit is configured to control to connect or disconnect the seventh node and the first voltage terminal under the control of the potential of the fifth node, and control to connect or disconnect the seventh node and the second clock signal terminal under the control of a potential of the eighth node;

the eighth node control sub-circuit is configured to control the potential of the eighth node according to the potential of the seventh node, wherein the conduction sub-circuit comprises a second conduction control transistor, the third node control sub-circuit comprises an eleventh transistor, and the seventh node control sub-circuit including a twelfth transistor and a thirteenth transistor; the eighth node control sub-circuit includes a third capacitor;

a control electrode of the second conduction control transistor is electrically connected to the second voltage terminal, a first electrode of the second conduction control transistor is electrically connected to the third node, and a second electrode of the second conduction control transistor is electrically connected to the eighth node;

a control electrode of the eleventh transistor is electrically connected to the first clock signal terminal, a first electrode of the eleventh transistor is electrically connected to the second input terminal, and a second electrode of the eleventh transistor is electrically connected to the third node;

a control electrode of the twelfth transistor is electrically connected to the fifth node, a first electrode of the twelfth transistor is electrically connected to the first voltage terminal, and a second electrode of the twelfth transistor is electrically connected to the seventh node;

a control electrode of the thirteenth transistor is electrically connected to the eighth node, a first electrode of the thirteenth transistor is electrically connected to the second clock signal terminal, and a second electrode of the thirteenth transistor is electrically connected to the seventh node;

a first terminal of the third capacitor is electrically connected to the seventh node, and a second terminal of the third capacitor is electrically connected to the eighth node.

13. The driving circuit according to claim 1, wherein the second node control circuit is configured to control to connect or disconnect the first node and the second node under the control of a second clock signal provided by a second clock signal terminal, and control to connect or disconnect the second node and the first voltage terminal under the control of a potential of the third node, and to maintain the potential of the second node, wherein the second node control circuit comprises a ninth transistor, a tenth transistor and a control capacitor;

a control electrode of the ninth transistor is electrically connected to the second clock signal terminal, a first electrode of the ninth transistor is electrically connected to the first node, and a second electrode of the ninth transistor is electrically connected to the second node;

a control electrode of the tenth transistor is electrically connected to the third node, a first electrode of the tenth transistor is electrically connected to the first voltage terminal, and a second electrode of the tenth transistor is electrically connected to the second node;

a first terminal of the control capacitor is electrically connected to the second node, and a second terminal of the control capacitor is connected to the first voltage terminal.

14. The driving circuit according to claim 1, wherein the light-emitting control output circuit comprises a first output transistor and a second output transistor;

a control electrode of the first output transistor is electrically connected to the third node, a first electrode of the first output transistor is electrically connected to a second voltage terminal, and a second electrode of the first output transistor is electrically connected to the light-emitting control signal output terminal;

a control electrode of the second output transistor is electrically connected to the second node, a first electrode of the second output transistor is electrically connected to the light-emitting control signal output terminal, and a second electrode of the second output transistor is electrically connected to the first voltage terminal.

15. The driving circuit according to claim 1, wherein the light-emitting control output circuit comprises a second conduction control transistor, a first output transistor, and a second output transistor;

a control electrode of the second conduction control transistor is electrically connected to a second voltage terminal, a first electrode of the second conduction control transistor is electrically connected to the third node, and a second electrode of the second conduction control transistor is electrically connected to the eighth node;

a control electrode of the first output transistor is electrically connected to the eighth node, a first electrode of the first output transistor is electrically connected to the second voltage terminal, and a second electrode of the first output transistor is electrically connected to the light-emitting control signal output terminal;

a control electrode of the second output transistor is electrically connected to the second node, a first electrode of the second output transistor is electrically connected to the light-emitting control signal output terminal, and a second electrode of the second output transistor is electrically connected to the first voltage terminal.

16. A driving method, applied to the driving circuit according to claim 1, the driving method comprising:

controlling, by the gate driving circuit, the gate driving signal output terminal to output the gate driving signal according the first clock signal provided by the first clock signal terminal and the first voltage signal provided by the first voltage terminal under the control of the potential of the first node, the first input signal provided by the first input terminal, and the reset signal provided by the reset terminal.

17. The driving method according to claim 16, wherein a driving cycle comprises a first input phase, a second input phase, a third input phase and a first reset phase which are arranged in sequence; the driving method comprises:

in the first input phase, the fourth node control circuit controlling to disconnect a fourth node from the reset terminal under the control of the potential of the first node, and controlling to disconnect the fourth node from the first voltage terminal under the control of the first input signal; the gate output circuit controlling to disconnect the gate driving signal output terminal from the first clock signal terminal under the control of the potential of the fourth node, and controlling to disconnect the gate driving signal output terminal from the first voltage terminal under the control of the first input signal, so that the gate driving signal output terminal maintains outputting the first voltage signal;

in the second input phase, the fourth node control circuit controlling to connect the fourth node and the reset terminal under the control of the potential of the first node; the gate output circuit controlling to connect the gate driving signal output terminal and the first clock signal terminal under the control of the potential of the fourth node, so that the gate driving signal output terminal outputs the first voltage signal;

in the third input phase, the fourth node control circuit controlling to disconnect the fourth node from the reset terminal under the control of the potential of the first node; the gate output circuit controlling to connect the gate driving signal output terminal and the first clock signal terminal under the control of the potential of the fourth node, so that the gate driving signal output terminal outputs a second voltage signal;

in the first reset phase, the fourth node control circuit controlling to connect the fourth node and the reset terminal under the control of the potential of the first node, and controlling to connect the fourth node and the first voltage terminal under the control of the first input signal; the gate output circuit controlling to disconnect the gate driving signal output terminal from the first clock signal terminal under the control of the potential of the fourth node, and controlling to connect the gate driving signal output terminal and the first voltage terminal under the control of the first input signal, so that the gate driving signal output terminal outputs the first voltage signal, wherein the driving circuit further comprises a gate reset circuit; the driving method further comprises:

in the first input phase, the gate reset circuit controlling to disconnect the gate driving signal output terminal from the first voltage terminal under the control of the potential of the first node;

in the second input phase, the gate reset circuit controlling to connect the gate driving signal output terminal and the first voltage terminal under the control of the potential of the first node;

in the third input phase, the gate reset circuit controlling to disconnect the gate driving signal output terminal from the first voltage terminal under the control of the potential of the first node;

in the first reset phase, the gate reset circuit controlling to connect the gate driving signal output terminal and the first voltage terminal under the control of the potential of the first node.

18. A driving module comprising a plurality of stages of driving circuit according to claim 1.

19. The driving module according to claim 18, wherein a second input terminal of the driving circuit is electrically connected to a light-emitting control signal output terminal of an adjacent previous stage of driving circuit;

or wherein a first input terminal of the driving circuit is electrically connected to a light-emitting control signal output terminal of an adjacent previous stage of driving circuit; or, the first input terminal of the driving circuit is electrically connected to the light-emitting control signal output terminal of the driving circuit;

or wherein a reset terminal of the driving circuit is electrically connected to a light-emitting control signal output terminal of an adjacent next stage of driving circuit; or, the reset terminal is electrically connected to a gate driving signal output terminal of an adjacent previous stage of driving circuit.

* * * * *